US007128263B1

(12) United States Patent
Nguyen et al.

(10) Patent No.: US 7,128,263 B1
(45) Date of Patent: Oct. 31, 2006

(54) SYSTEM AND METHOD FOR AUDIO INTERFACE AND NAVIGATION FOR GENERATING A PAPER RECORD

(75) Inventors: Yung T. Nguyen, Louisville, KY (US); K. Vu Nguyen, Louisville, KY (US); T. Andrew Weixler, New Albany, IN (US)

(73) Assignee: IVS, LLC, Louisville, KY (US)

( * ) Notice: Subject to any disclaimer, the term of this patent is extended or adjusted under 35 U.S.C. 154(b) by 337 days.

(21) Appl. No.: 10/288,023

(22) Filed: Nov. 5, 2002

Related U.S. Application Data

(60) Provisional application No. 60/337,584, filed on Nov. 5, 2001.

(51) Int. Cl.
*G06F 19/00* (2006.01)

(52) U.S. Cl. ........................................ 235/385; 705/12

(58) Field of Classification Search ................ 235/386, 235/385; 705/12
See application file for complete search history.

(56) References Cited

U.S. PATENT DOCUMENTS

2003/0066872 A1* 4/2003 McClure et al. .............. 235/51

* cited by examiner

*Primary Examiner*—Karl D. Frech
(74) *Attorney, Agent, or Firm*—Middleton Reutlinger; Robert H. Eichenberger; Alexander P. Brackett

(57) ABSTRACT

A system and method for providing users with visual, English language comprehension, cognitive, or other limitations an intuitive audio interface and navigation method for use in automated systems which generates an official paper record of the session. A particularly useful application of the system is for voting systems whereby users listen to instructions and ballot choices via a telephonic device and use a standard 12-key telephone touchpad to enter selections. The selections made are printed in English and the voter's selection language, and also encapsulated in a two-dimensional identification symbol that is printed on an official paper ballot to be tabulated. Machine, ballot, and anti-fraud information is likewise encoded in the identification symbol for ensuring election integrity and complete accuracy. The barcoded paper ballots are the official ballots that serve as a physical audit trail.

13 Claims, 21 Drawing Sheets

SYSTEM AND METHOD FOR AUDIO INTERFACE AND NAVIGATION FOR GENERATING A PAPER RECORD

CROSS-REFERENCE TO RELATED APPLICATIONS

This application claims the benefit of U.S. Provisional Application Ser. No. 60/337,584, filed Nov. 5, 2001.

FIELD OF THE INVENTION

The present invention relates to a system and method for voting, and in particular, a system and method for voting using an audio interface on a telephone or personal digital audio player interface to allow voters to hear options, indicate selections using telephonic inputs, and have those selections marked on a printed ballot in human-readable format as well as encapsulated thereon in a unique machine-readable identification symbol for rapid tabulation, data aggregation, and physical auditing.

BACKGROUND OF THE INVENTION

The act of voting is the right of every American and lies at the very core of our system of government. However, as the methods and machinery of conducting elections have advanced through the years from handwritten paper ballots to mechanical lever machines to optically scanned paper ballots, and even more modem touch screen computers, several deficiencies have developed related to the ability to ensure a fair, accurate, and secure system of recording and tallying voters' intent, and then subsequently verifying the same. Various systems have attempted to address, with varying degrees of success, the problems inherent in ensuring the integrity of the voting system. While some generally-known devices may provide an accurate method of recording a vote, for example a Direct Recording Electronic system (DRE), that very system typically provides no physical auditable trail for post election verification and recounts. And, to the extent the DRE system provides an electronically auditable trail, many voters inherently do not trust that such systems are tamper-proof. In addition, voting technology experts distrust such systems because those systems use the same machine that records the votes to also produce the electronic audit trail. Such systems are not independently verifiable.

More importantly, regardless which type of generally-known system is involved (whether paper, mechanical, or electronic), a significant segment of the population has not benefited by the developments in voting systems, and in fact has continued to be excluded from voting in the same manner as other citizens. Voters who are blind or visually impaired, have language-comprehension difficulties or are illiterate, or have cognitive disabilities have continued to be unable to cast their own ballots privately and independently-without the assistance of a poll worker, family member, or friend.

While all voting systems rely on textual or visual ballots such as those using paper or computer screens, several manufacturers of DRE voting machines have appended to their product a complicated secondary interface which provides audio prompts for voters who are blind or visually impaired to respond by pressing a button or buttons indicating their preference. These existing DRE voting systems comprise machines that are very costly for most jurisdictions to purchase or lease, are very complex to configure and stage prior to conducting an election, must be administered by a specially-trained, highly technical worker, and only record the intent of the voter—they do not typically provide a physical, auditable paper trail, such as a paper ballot. And, as stated above, such systems are therefore not independently verifiable. A physical auditable trail provides counties the ability to inspect the actual ballot cast by the voter and serves as a double check in recounts.

Many existing DRE voting systems require two proprietary machines to function: a control unit and a voting machine. This system architecture results in very expensive deployment costs for jurisdictions that want to implement a precinct-level accessible voting solution, doesn't allow for use of commercially available products that assist the disabled, and makes the logistics of providing curbside voting awkward at best.

Moreover, because of the complexity of these proprietary, computer-based devices, configuration and staging of the machines takes several weeks to perform using proprietary programming tools. The addition of more voting devices only increases the time and costs to complete pre-election staging.

Additionally, because these DRE voting systems are designed only to record the voter's intent, they are required to provide system security and authenticate the voter by using technologies such as "smart cards" that are activated by proprietary control units. The use of these technologies results in a need for highly-trained election officials and precinct workers that must be recruited and trained by the jurisdiction or supplied by the vendor. Municipalities and counties that conduct voting simply cannot supply the number or the type of highly-trained election officials for these systems, and surely cannot supply them in numbers to allow such systems to be used at every precinct. In fact, a recent lawsuit in Washington, D.C., compelled the election entity to purchase over a million dollars worth of audio-capable DRE voting machines so that each precinct would have access to a machine. Despite such a large expenditure, the election entity was still unable to use that equipment during the election because of the inability to find and train workers in the technical procedures necessary to successfully operate the machines.

Moreover, the absence of a physical paper audit trail for existing DRE voting systems has recently called into question the validity of the results in several elections across the country. No current system, DRE or otherwise, that provides an audio ballot interface generates an official paper ballot for physical audit purposes. While several existing products can be altered to generate a paper receipt summarizing the results of the day's voting, no product or system produces an official paper ballot imprinted with a unique identification symbol for each voter that contains their actual selections using the audio ballot interface, and that also contains audit and anti-fraud codes to ensure complete integrity in the voting system, while maintaining voter anonymity.

In addition, an important concern of the challenged voters in the aforementioned consumer segment is the difficulty in learning what candidates and contests will be on the ballot and learning how to navigate and make selections on voting machines including those that may have a secondary audio interface for the ballot.

Currently, there is no means for voters to learn about the voting machines other than at the time of voting on election day. This contributes to apprehension among voters, not to mention long delays while the voter takes time to learn not only the navigation and method for casting a ballot using the audio interface, but also to learn who the candidates are and what contests and issues are involved in the election. The type of navigation system employed in current systems requires special buttons and awkward menu structures that are not intuitive. Most require the user to perceive and interpret physical stimuli (such as button shapes or raised appurtenances) associated with the buttons or keys. Because these devices use unique proprietary user interfaces, the voter must spend time to learn how the device operates before the voter can even begin to cast votes.

The generally-known systems also have failed to accommodate voters who are visually impaired and other challenged voters such as those who have limited knowledge of the English language. Such voters have no convenient way of learning ahead of time which candidates and which election contests will be on their ballot in their precinct. Even in the limited number of jurisdictions that make special efforts to serve the visually impaired and language-challenged citizens, sample ballots that list all candidates in all contests are occasionally prepared in Braille and additional languages other than English. However, the voters must be able to decipher the candidates and contests that will be applicable in their voting district, and must physically go to the election office to pick up the sample ballot. For the vast majority of such voters, this mandate is untenable.

There is recently a growing chorus of public opinion, lawsuits, and legislation that reinforces the awareness of the basic need for citizens with certain conditions such as blindness, visual impairments, cognitive disabilities, illiteracy, and other language-comprehension difficulties (such as limited knowledge of the English language) to cast their own ballots privately and independently without relying on textual or visual ballots such as those using paper or computer screens.

In the current marketplace, there are no voting systems using a simple audio ballot interface which jurisdictions can implement on a precinct-wide level that is also affordable, simple for election officials to configure and stage, simple for voters to use, and which can provide voters the opportunity to preview the actual ballot and practice casting votes in the identical manner in which the actual voting will be conducted, thus allowing voters to be certain that their official ballot was properly cast according to their desires in an efficient and timely manner, and which also provides a physical audit trail.

SUMMARY OF THE INVENTION

Accordingly, the present invention is directed to system and method for an audio interface and navigation protocol for users of automated systems without the need for visual-based interface. More particularly, the present invention is directed to a system and method for allowing users to hear automated choices and then use a standard, common, and familiar input device to make selections that are recognized by the system, printed, tallied, stored, and otherwise handled according to the particular applications employed. It should be understood at the outset that the invention relates generally to audio interface and keypad-based user input devices, which can be used in a plethora of applications, including standardized testing; surveys (such as for employees or customers and the like); governmental testing; educational testing; voting; and so forth. The preferred embodiment incorporates the system in voting applications.

The invention preferably incorporates an election management system that prepares an election data set containing all information related to all elections to be conducted in a jurisdiction. The election data set is then loaded into one or more user modules that typically comprise a processing unit and one or more user interfaces. The processing unit comprises software and an operating system, as well as a telephony voice card, a display, a keypad, non-volatile memory, and a media bay (such as a CD-ROM drive). The user interface can be connected to the telephony voice card via one or more telephone simulators. In addition, a printer is connected to the processing unit. Once the user has made all desired selections, an official ballot is printed automatically. The official ballot includes the user's selections in human-readable format to assist in manual recounts, and also encodes the user's selections in a unique machine-readable format, or an identification symbol. The official paper ballot becomes an independent, verifiable physical audit trail. The identification symbol also preferably contains other information encoded therein to assist in identification and anti-fraud procedures, and is advantageously independently verifiable.

The election data set can also connect to a preview and practice server that can allow users to dial into the server and preview and practice on the actual ballots that are applicable to that user. This feature maximizes the use and benefit for all voters, but especially those voters with visual or other cognitive disabilities.

It should also be recognized that some components of the invention could be substituted for other components, for example: various input devices could be used, including but not limited to voice-activated responses or voice-recognition software. However, for the sake of brevity and for ease of understanding, the description of the system and methods employed in the present invention will be made with reference to voting applications using a standard 12-key telephone touchpad input device.

BRIEF DESCRIPTION OF THE DRAWINGS

The teachings of the present invention can be readily understood by considering the following detailed description in conjunction with the accompanying drawings, in which.

DETAILED DESCRIPTION OF THE PREFERRED EMBODIMENT

While the present invention will be described more fully hereinafter with reference to the accompanying drawings, in which particular embodiments and methods are shown, it is to be understood from the outset that persons of ordinary skill in the art may modify the embodiments of the invention described herein in unanticipated ways that still might achieve the functions and results of this invention. Accordingly, the descriptions which follow are to be understood as illustrative and exemplary of specific embodiments within the broad scope of the present invention and not as limiting the scope of the invention. In the following descriptions, like numbers refer to similar features or like elements throughout.

As stated previously, it should be understood that the invention relates to a unique audio interface system and navigation system for users of automated systems to hear selection choices and input selections without the need for any visual interaction whatsoever. The applications for the unique systems and methods herein described are many, and all of the relevant applications cannot be discussed at length. As but a few examples, such relevant applications include, but are not limited to, voting systems, standardized testing; survey applications (such as for employees, customers, demographics, and so forth), governmental testing (governmental exams, drivers' testing), and so forth. A particularly useful application of the systems and methods herein described relates to voting systems, and in particular, to a system and method for voting using a telephonic or similar audio interface to allow voters to hear options via a standard telephone (or, in an alternative embodiment, a portable digital audio player having a telephone-like keypad) and indicate their selections using standard keys on a telephone, both to preview and practice voting as well as to actually vote in an election. In addition, such a useful application can capture the voters' selections and write them into a unique machine-readable identification symbol, such as a two-dimensional barcode, on a paper ballot for rapid tabulation and data aggregation. For ease of reference and for consistency, all of the following description will be directed to the preferred system of voting, it being understood by persons of ordinary skill in the art that the systems and methods can be simply adapted for use in the many additional applications available. As a result, terms such as "user" and "voter" may be used interchangeably since the user of the system of the preferred embodiment for voting will be a voter.

Figure 1:
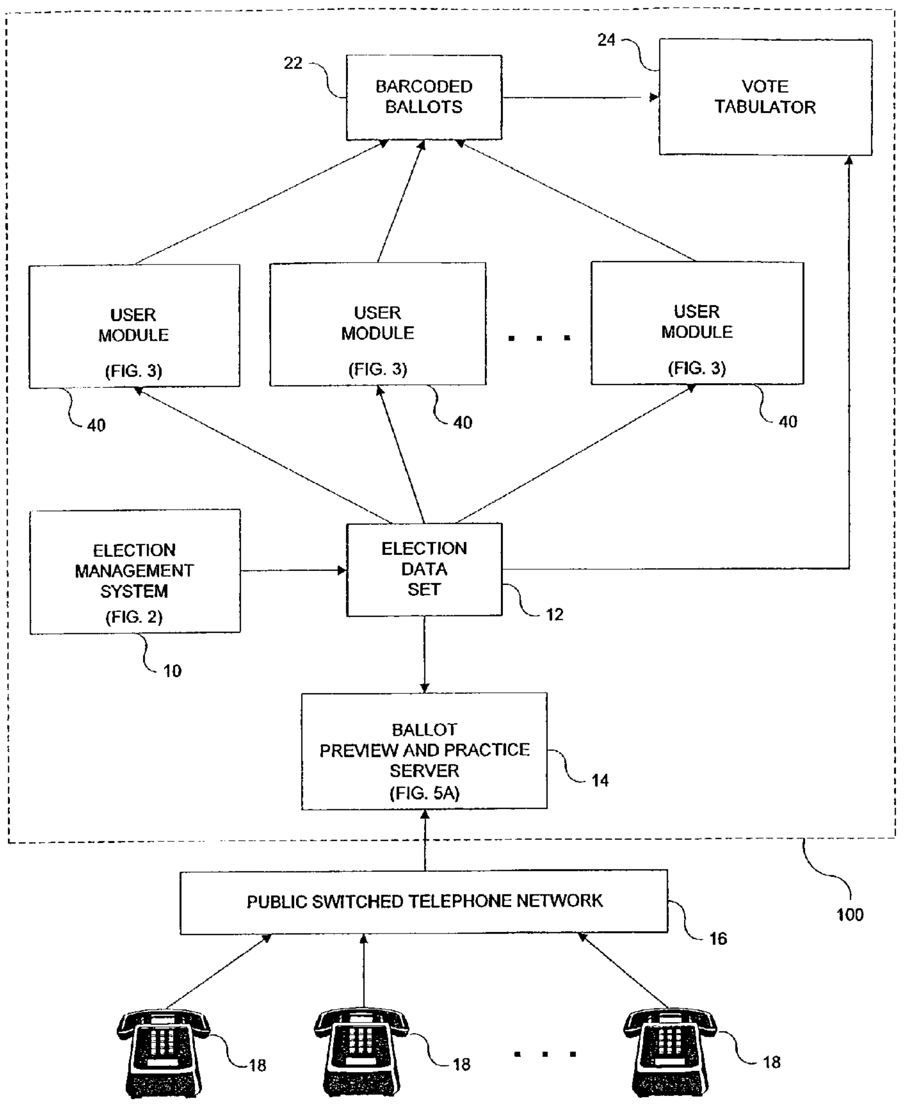
FIG. 1 is a schematic illustrating the overall architecture of a system according to a preferred embodiment for use in elections.

FIG. 1 is a schematic block diagram illustrating the overall architecture of the preferred embodiment used as a system 100 for voting. The system 100 is comprised of four major components: an election management system 10, a ballot preview and practice server 14, user modules 40, and a vote tabulator 24.

Figure 2:
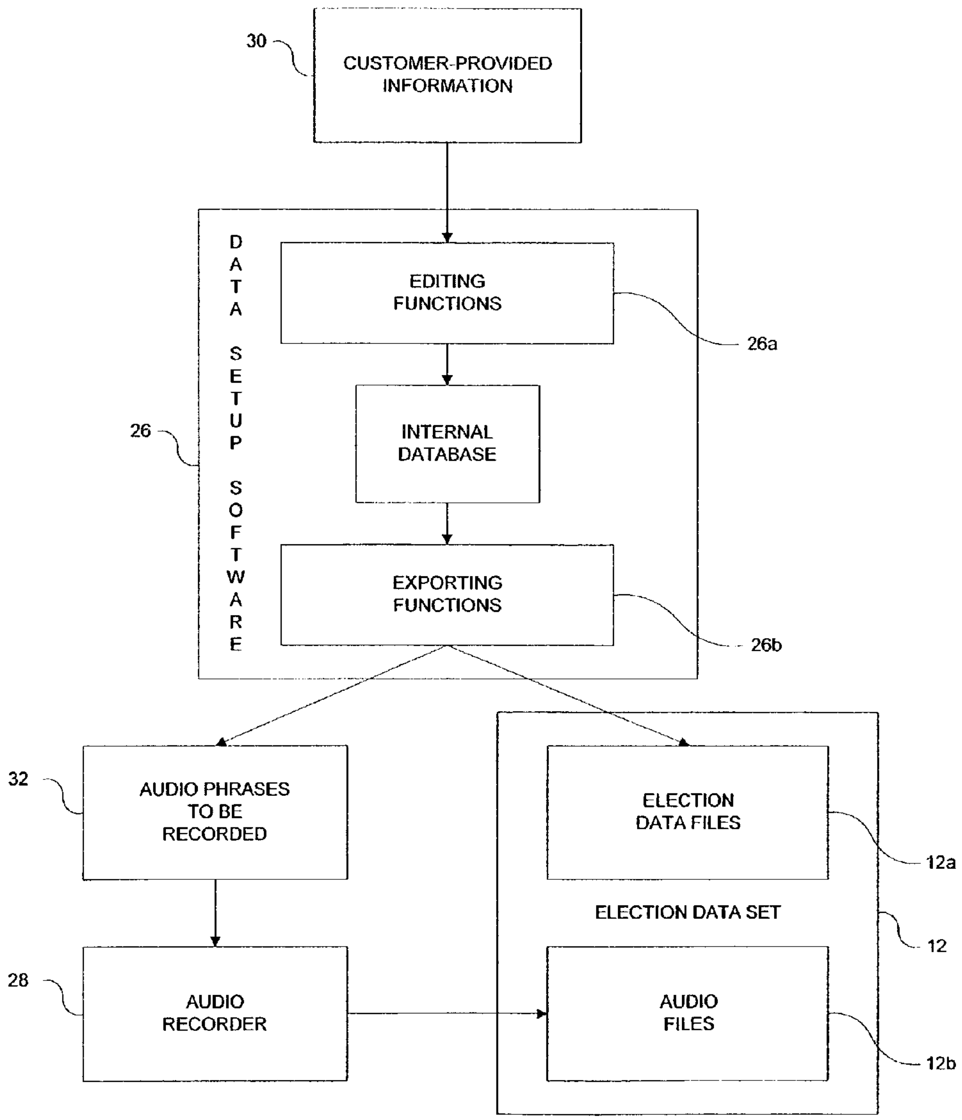
FIG. 2 is a schematic illustrating the main steps and components of the preferred embodiment of an election management system and relationship to files generated for use by the user module.

FIG. 2 provides an overview of the election management system 10. In general, the election management system 10 is used to set up all the data needed for the other three components to function properly. Once the data is collected and input, the election management system 10 generates a list of audio phrases 32 to be recorded for that election. The recorded audio files, together with other text files exported by the election management system 10, form the election data set 12. The very same election data set 12 can then be used in or fetched into the ballot preview and practice server 14. This allows the public to be able to preview the ballot applicable to each individual voting precinct and to practice making selections using input devices 18 such as standard telephones over the public switched telephone network (PSTN) 16.

Once the election details are known and input into the election data set 12, a plurality of identical CDs containing the election data set 12 are created and shipped to the customers (for example, municipal or county governments). One such CD is typically needed at each user module 40 or the vote tabulator 24. On Election Day, the voters go to their respective polling locations and use a user module 40 to make ballot selections, which creates barcoded ballots 22. At the end of the day, the barcoded ballots 22 are gathered in a central location to be counted by the vote tabulator 24.

More specifically, FIG. 2 illustrates the main components and input and output of, as well as the flow of information through, the election management system 10. The two major components are data setup software 26 and audio recorder 28. The data setup software 26 has two major sets of functions: editing functions **26*a* and exporting functions 26*b***.

Customers, such as county governments, provide customer-provided information 30 for input into the system. The customer-provided information typically comprises information related to counties and precincts involved, election contests being held, candidate information, referendum information, and so forth, as well as information regarding the details of the voting procedures and setups (for instance, whether straight-party ticket voting is possible, whether certain contests can have more than one candidate selected, and so forth). The owners of the software for the system 100 receive the customer-provided information 30 and perform the necessary editing functions **26*a* in order to correctly format the customer-provided information 30** for use by the software.

After the editing functions 26*a* process the customer-provided information 30, the exporting functions 26*b* produces two sets of text files. The first set is the election data files 12*a* which is used by the election software for setting up the election formats. The election data files 12*a* are preferably text files, such as ASCII, unicode, and so forth, so that the data can be reviewed by anyone without the need for special equipment. The second set is the audio phrases 32 to be recorded. The scripts for the audio phrases 32 are exported and used in a recording studio as input to the audio recorder 28 and to produce a set of audio files 12*b* (preferably .wav files). Together with the election data files 12*a*, this set of audio files 12*b* form the election data set 12. The audio files 12*b* comprise all of the text that will be needed for all possible voting scenarios, based in part upon the customer-provided information 30. The election data set 12 is then loaded onto a convenient medium (preferably a standard compact disc (CD)) for shipping to the customer.

Figure 3:
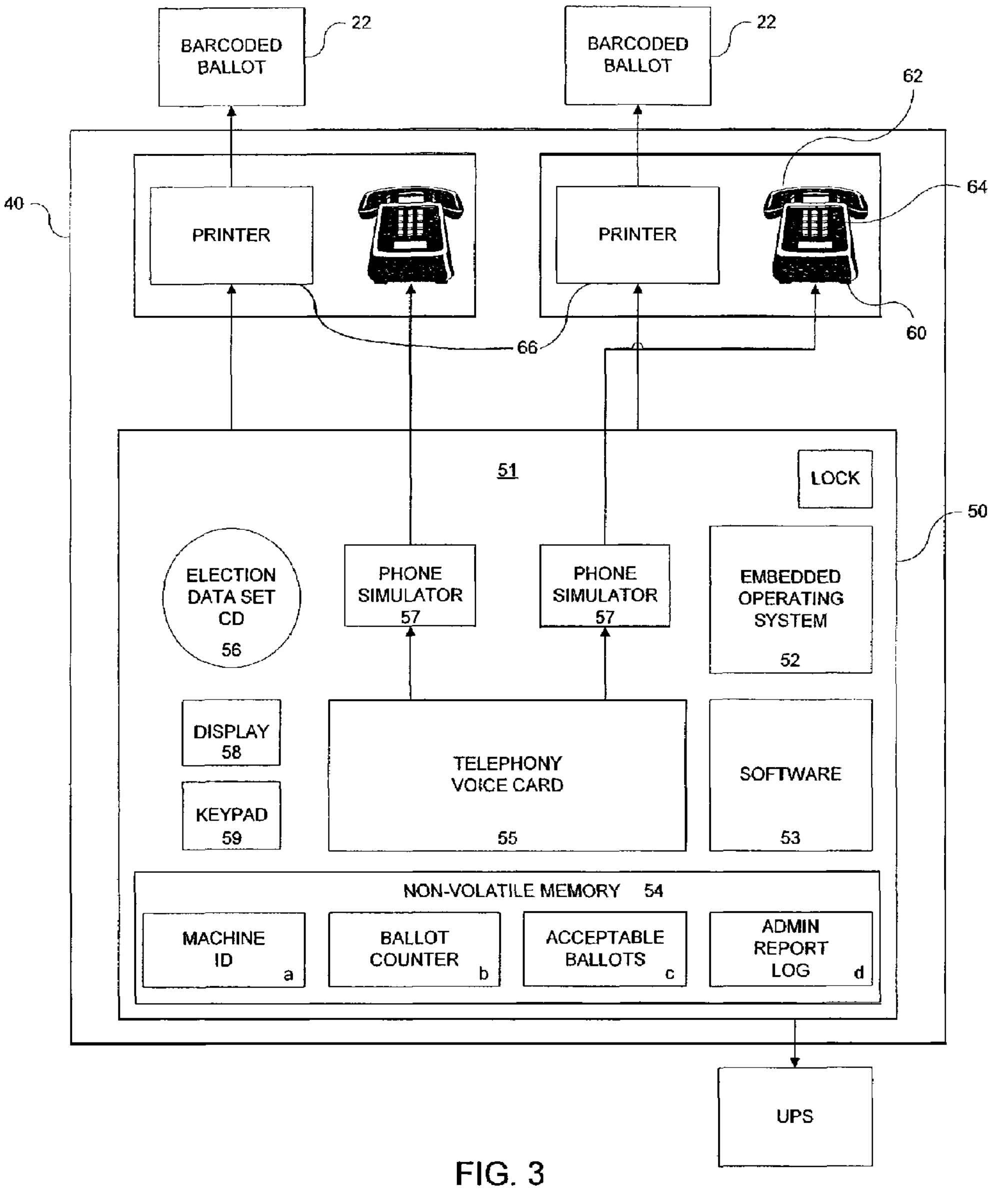
FIG. 3 is a schematic and partial flow-chart illustrating the major components of the preferred embodiment of a user module.

FIG. 3 is a diagram depicting a user module 40 according to the preferred embodiment. The user module 40 comprises a processing unit 50 and one or more user interfaces 60. The user interface 60 generally comprises a receiver 62 and an input device 64. In the preferred embodiment, the user interface 60 comprises a basic telephone having a normal handset as its receiver 62 and a standard telephone 12-button keypad as its input device 64. In addition, the receiver 62 could be a set of headphones or the like. Because the preferred system 100 uses a telephony voice card, the system 100 can accept (via a standard telephone jack) and use any telephone or standard telephone-compatible device. Such devices may be special telephones or devices that persons with disabilities need in order to utilize services via telephone. However, it is possible that a personal digital audio player could be used in lieu of the processing unit 50, and could eliminate the need for the telephony voice card. Such an embodiment is not preferred, however, since it would remove the above-referenced telephone-compatibility present in the preferred embodiment.

In addition, a printer 66 (preferably a Windows-compatible laser printer) is coupled to the processing unit 50 and can print a paper ballot that contains the user's selections and that also contains an encoded identification symbol (preferably a two-dimensional bar code) that contains information pertaining to the ballot 22, the user module 40, and the user's selections.

The processing unit 50 further preferably comprises a housing 51 that contains an operating system 52, software 53, non-volatile memory 54, a telephony voice card 55, a media bay 56, a telephone simulator 57 for each user interface 60, and can also comprise a display 58 and a keypad 59. The keypad 59 can act as an input device for the purpose of configuring the processing unit 50 prior to voting. As can be seen in FIG. 3, the preferred user module 40 is a stand-alone device that can operate on AC power or DC power (or alternate power sources). In the preferred embodiment, the user module 40 operates on standard 120 volt alternating current. It is important to note that no other connections—in particular, no connection to an outside telephone line—are required for the user module 40 to operate. In other words, the user module 40 is a closed system.

Preferably, processing unit 50 is a Pentium class single board computer with 256 MB RAM and 48 MB CompactFlash. In addition, the software 53 preferably is software developed, for example, in Microsoft VB.net and is run on a Windows XP embedded operating system 52, and includes a 2D barcode generation software (for example, DataMatrix ActiveX Control from IDAutomation.com Inc.). The operating system 52 need not be an embedded system, but an embedded system is preferable since it enables the processing unit 50 to be bootable from non-volatile memory or a CD-ROM; it enables simple power up/power down without complicated startup or shutdown procedures; and it renders program or software tampering more difficult. The software 53 is configured such that when the processing unit 50 is powered on, the software runs automatically without the need for a bootup procedure. Similarly, the processing unit 50 can be powered off at any time without the problems associated with hard disc corruption or other issues associated with software that requires a bootup procedure. The telephony voice card 55 is a pc-card that provides an interface for telephones and the like. Many variations of voice cards 55 are possible, including voice cards 55 having multiple ports for multiple telephones. For instance, voice cards 55 capable of handling 2, 4, 8, 16, or even 24 telephones are commonly available. A Dialogic D/4 PCI telephony card is preferred.

It should be recalled that an alternative embodiment is possible whereby such system can operate without a telephony voice card and telephone simulator. In such embodiment, for example, a portable digital audio player with a keypad can be implemented to serve as the user module 40. However, for compatibility reasons, such embodiment is not preferred.

As stated previously, the preferred user module 40 does not make any data connections outside the processing unit 50. However, as can be seen in FIG. 3, a user interface 60 (such as a standard telephone push-button) is part of the user module 40. Therefore, in order for the user interface 60 to function properly (and to make the voice card 55 behave as though it were connected to a publicly switched telephone network 16), one or more telephone simulators 57 is used. The telephone simulator 57 is set up so that as soon as the user takes the receiver 62 off the hook, the telephone simulator 57 immediately rings the voice card 55. As far as the voice card 55 is concerned, a telephone call is being received and is to be answered accordingly by the software 53. A Skutch AS-66 four line simulator is preferred.

Once the user interface 60 is enabled (in the preferred embodiment, by picking up the handset), the software 53 begins by playing an introductory greeting from the audio files 12*b* to the user to begin using the system 100.

The processing unit 50 of the preferred embodiment further comprises non-volatile or non-volatile memory 54 that contains both working memory and stored memory. In the preferred embodiment, the non-volatile memory is 48 MB CompactFlash. In the preferred embodiment, the information that is stored in the stored memory comprises a machine identification 54*a*, a ballot counter 54*b*, acceptable ballots 54*c*, and an administrative report log 54*d*. The machine identification 54*a* can take many forms, including, for example a serial number or the microprocessor identification embedded by its manufacturer, and so forth. The ballot counter 54*b* is preferably a sequential counter that is incremented each time a ballot is printed by the printer 66. The processing unit 50 does not store a user's selections. The machine identification 54*a* and the ballot counter 54*b*, together, are encoded in the identification symbol 23 on the ballot 22 that is printed. Thus, every ballot 22 that is printed by the printer 66 will have a unique identification symbol 23. This provides one level of fraud protection. If someone were able to photocopy a printed ballot or to write a program to re-create a particular symbol identification and attempt to use that as an official ballot, the vote tabulator 24 would clearly see the ballot as fraudulent since every official ballot has a unique combination of machine identification 54*a* and ballot counter 54*b*. Also, when read by the vote tabulator 24 (described below), this also provides fraud protection against a single ballot being counted more than once, since the device that reads the identification symbol will recognize duplicative counting.

In the preferred embodiment, prior to sending the user module 40 to the customers, the system 100 developer will write into the non-volatile memory 54 of each user module 40 a machine identification 54*a* (serial number) and a ballot counter 54*b* (which is set to '0' at shipping). The serial number is a numerical string that uniquely identifies every user module 40. The ballot counter 54*b* is an ever-increasing counter that is incremented every time a ballot is printed. Together, the serial number and the ballot counter 54*b* uniquely identify every ballot that is ever produced by any user module. The serial number 54*a* and ballot counter 54*b* will be incorporated into the bar code that is created on each official ballot 22 to ensure that each official ballot 22 has a unique, hidden identifier that can be used in preventing double counts, but that still ensures secrecy and anonymity for the voter. In the preferred embodiment, the machine identification 54*a* will be a ten (10) digit number consisting of three sections: year shipped (2-digit); state ID (2-digit, representing alphabetical listing of states); and machine identification (6-digit, auto-number). For example: 0201000001. Obviously, however, the machine identification could use any numbering scheme, as long as it gives each machine ever made a unique identifier.

The acceptable ballot portion 54*c* of the non-volatile memory enables the processing unit 50 to determine which ballots are acceptable for printing in the precinct in which the processing unit 50 is placed. Each ballot format is assigned a control number during the election management stage. During the configuration or staging process, the administrator inputs control numbers for each acceptable ballot for a particular processing unit 50. This information is written into the acceptable ballot portion 54*c* of the non-volatile memory 54.

Figure 6:
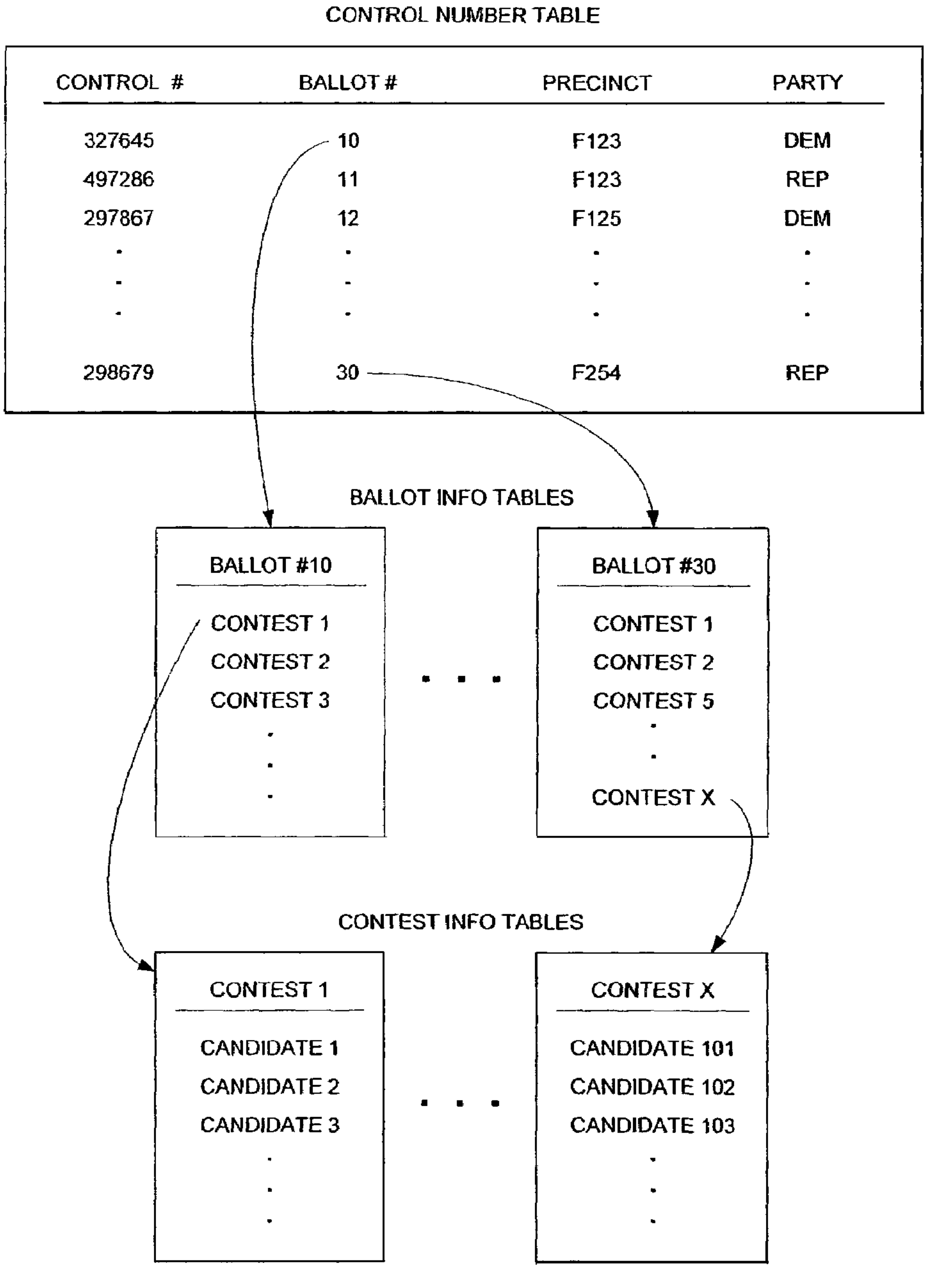
FIG. 6 illustrates exemplary data text files in the election data set that are used to build a ballot format given a control number, according to the preferred embodiment.

During the data setup phase, the election management system 10 of the preferred embodiment will assign a unique number, called a control number, to each ballot format that is used by a particular precinct. In other words, given the control number, one can identify the exact ballot format and the precinct where it is used. The customer can define the format and length of control numbers and to which ballot type of precinct they correspond. This information is then included on the CDs to enable election officials to set, and poll workers to verify, the settings prior to opening the polls. FIG. 6 illustrates a portion of a typical data text file in the election data set 12 that contains cross reference tables containing ballot information and contest information. All separate ballots that are to be used are assigned a control number.

Figure 4:
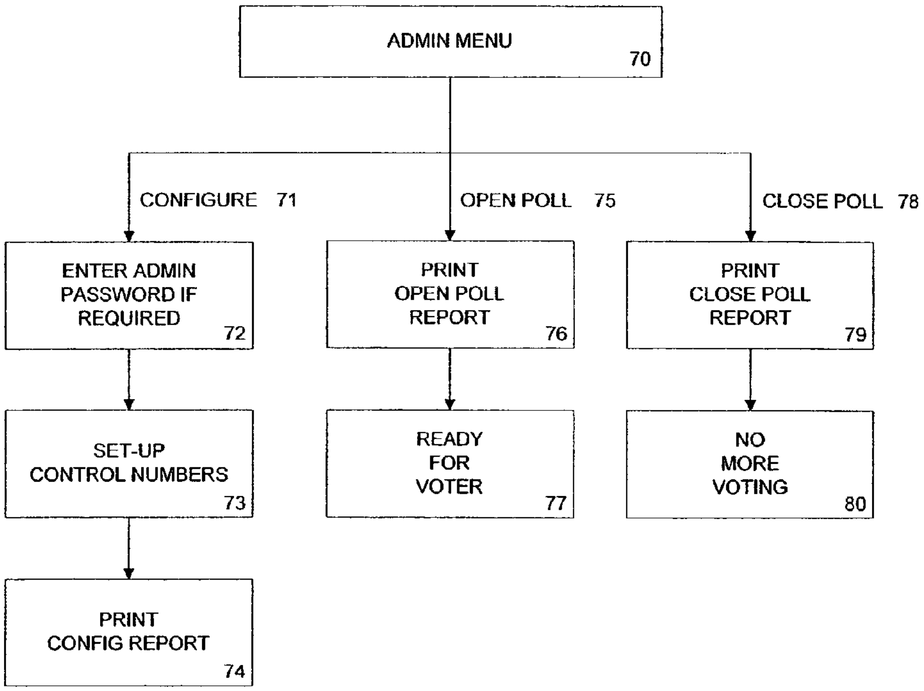
FIG. 4 is a flow chart illustrating the administration menu for configuring the processing unit, opening the poll, and closing the poll, according to the preferred embodiment.

Now, the election data set 12 CDs contain all the information related to the elections, including all contests, candidates, ballot styles, and so forth. The system developer, upon creating the CDs in the editing functions of the election management system 10, loads all that information onto the CDs and sends them to the customer. Sufficient numbers of CDs—all of them identical—are sent to the customer well in advance of the election. The election officials insert the CDs into the media bay 56 of the processing unit 50 of the user module 40. The system automatically brings up an administration menu 70, as shown in FIG. 4 that can be displayed on display 58 or transmitted audibly to the receiver 62.

Once the election data sets 12 are loaded into the user module 40, election officials can perform three separate functions within the administration menu 70: configure the processing unit (step 71); perform an "open poll" procedure (step 75); and perform a "close poll" procedure (step 78). The open poll procedure (step 75) and close poll procedure (step 78) are typically conducted by the poll workers on election day. The configure process (step 71) is typically performed by election officials sometime before election day in order to initialize the processing unit 50 for use during the election.

To configure the processing unit 50, the official inserts the CD into the media bay 56, whereupon the software prompts the official for a selection as to which administration procedure is desired. For example, the official will make an input on the input device 64 (or keypad 59) (e.g., enter "1" to configure the system (step 71); enter "2" to open poll (step 75); enter "3" to close poll (step 78)). After selecting configure (step 71), or perhaps even prior to entering the administration menu 70, the official may be prompted to enter a password (step 72). Once the password is input, the official is prompted to input the control numbers (step 73) that correspond to the ballots that are acceptable for this processing unit 50 at this particular location. The election official configuring the user module 40 will then be prompted with a menu used to enter the control numbers on this machine. The menu preferably will have options such as: add a control number; delete a control number; delete all control numbers; confirm current, active control numbers; system self-test; secure and shut down system. The official may then choose to enter and confirm the control number representing each precinct(s) or ballot types that the user module 40 will support in the upcoming election. When the election official confirms that the control numbers are correct, an accompanying printer will then print a barcoded paper receipt of these settings (step 74). This settings receipt is to be collected by the election office and distributed to poll workers and polling locations to use as a settings reference. Although it may be desirable for jurisdictions to complete this simple configuration of each machine prior to election day, it is not necessary to do so.

On the morning of election day, the poll worker will obtain the user module 40 and plug into a power outlet (if the user module is not fitted with alternate power source). The user module 40 will turn on and boot automatically after it is plugged in, and may automatically ring a user interface 60 to allow the poll worker to verify setup and/or perform setup. The poll workers can verify that the processing unit 50 has been properly configured for the precinct in which it is placed by listening to the control numbers (or viewing them on display 58) that have been input by the election officials as previously described. If the processing unit 50 has been properly configured, the poll worker can open the poll (step 75) by selecting this option. The poll worker opening the user module 40 for voting then confirms that the control numbers shown on the display 58 are correct and match the receipt provided for this purpose. In embodiments having no display 58, the poll worker can confirm this information through the receiver 62.

When the poll worker confirms that the control numbers are correct, an accompanying printer will then print a barcoded paper receipt of these settings. This settings receipt is to be collected by the poll worker and included as part of the physical audit trail. If the control numbers are not correct, the poll worker can select the configure option (FIG. 4, step 71) from the menu to make any necessary changes to the configuration. In order to activate the user module 40 of the preferred embodiment for voting, poll workers select the open poll option (step 75). Every time the poll worker selects open poll (step 75), an open poll report (step 76) is printed and the user module 40 is then ready for voting (step 77). Each time an open poll procedure (step 75) is performed on the user module 40, a log is made in the administrative report log 54*d* portion of the non-volatile memory 54 of the processing unit 50 (see FIG. 3).

Similarly, at the end of the election day, the poll workers can run a close poll procedure (step 78) that automatically disables the user module 40 from further voting (step 80). When the poll worker selects to close poll (step 78), a close poll report (step 79) is automatically printed and can be used for audit purposes. Each time a close poll procedure (step 78) is performed, a log is created in the administrative report log 54*d* portion of the non-volatile memory 54. Because the close poll procedure (step 78) automatically disables the user module 40 from further voting, if a person attempted to use the user module 40 for casting fraudulent votes, the person would have to run an open poll procedure (step 75), which, again, automatically is recorded in the administrative report log 54*d* of the non-volatile memory 54, along with all system events, excluding voters' selections.

Figure 5:
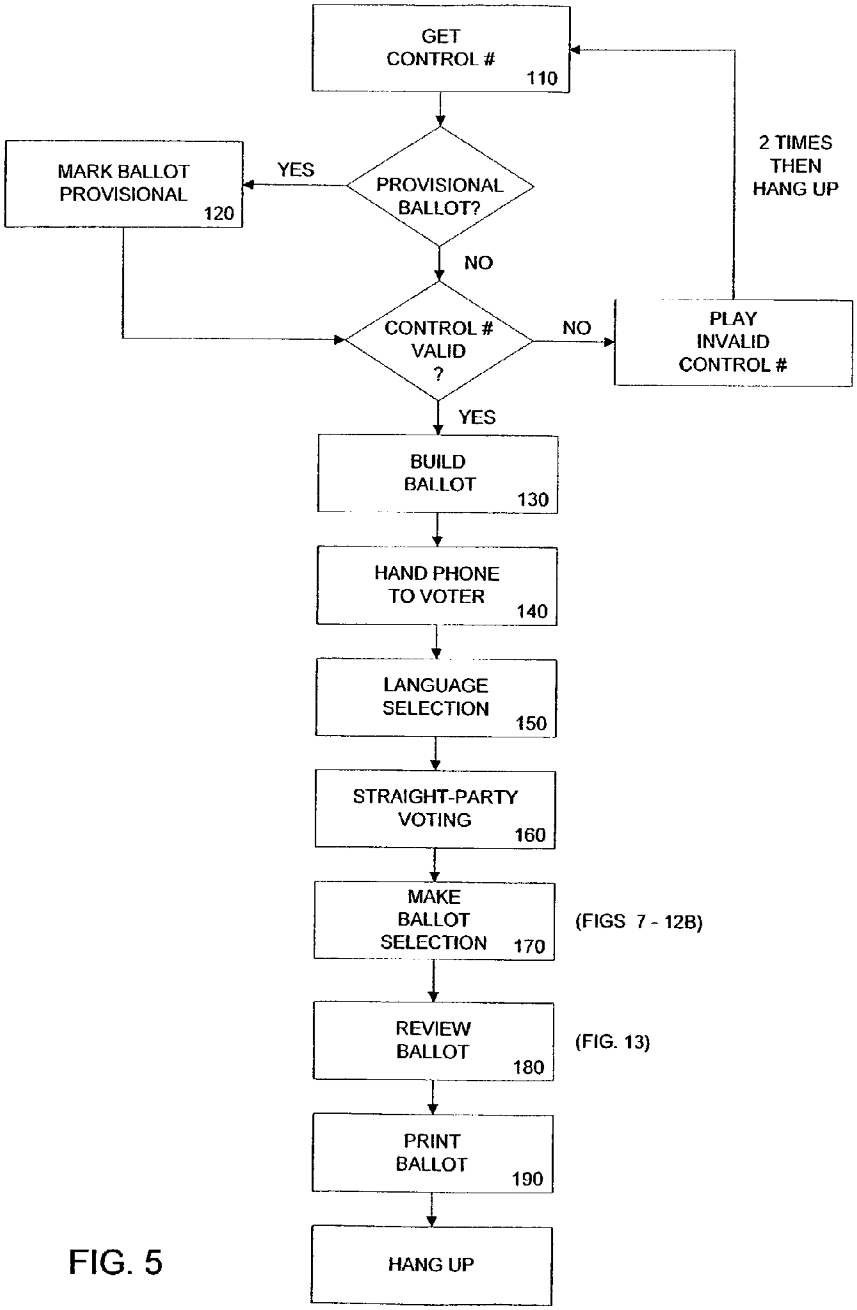
FIG. 5 is a flow chart illustrating the major steps in the methods of using the invention according to the preferred embodiment for voting system applications.

On election day, after the user modules 40 have been properly configured (steps 71–74) and the poll workers have opened the polls (steps 75–77), the user modules 40 are now ready for use by voters. FIG. 5 illustrates the overall flow of a typical voting procedure, according to the preferred embodiment, after the user module 40 has been configured and the open poll process (step 75) has been performed. Typically, a poll worker will accompany the voter to the voting booth and will pick up the receiver 62 and enter the control number (step 110) that is applicable for that particular ballot. If the ballot is to be deemed a provisional ballot (for instance, where a voter insists she is qualified to vote in a precinct, but the poll workers' records do not reflect that fact, the system allows that person to cast votes, but the ballot is encoded with a marker indicating it is provisional until the voter's valid status is confirmed), the poll worker indicates as such (step 120) using the input device 64.

The poll worker then enters the control number for the acceptable ballot to be used. The processing unit 50 then builds the ballot (step 130) for the voter by cross referencing the ballot information tables, contest information tables, and other tables necessary for the ballot used (see FIG. 6). The poll worker then relinquishes control of the user module 40 to the voter (step 140). The voter is now ready to begin voting.

FIG. 5 shows the macroscopic steps involved in the voting process according to the preferred embodiment. The first choice the voter makes, if applicable, is to select the language the voter desires (step 150). Next, the voter selects whether to vote by a straight party ticket (step 160) if such possibility is allowed by the election laws of the state or jurisdiction. If not, the voter begins making selections (170) by listening to the instructions from the audio files 12*b* applicable to the ballot and making selections using the input device 64, the details of which will be discussed below.

Figure 5A:
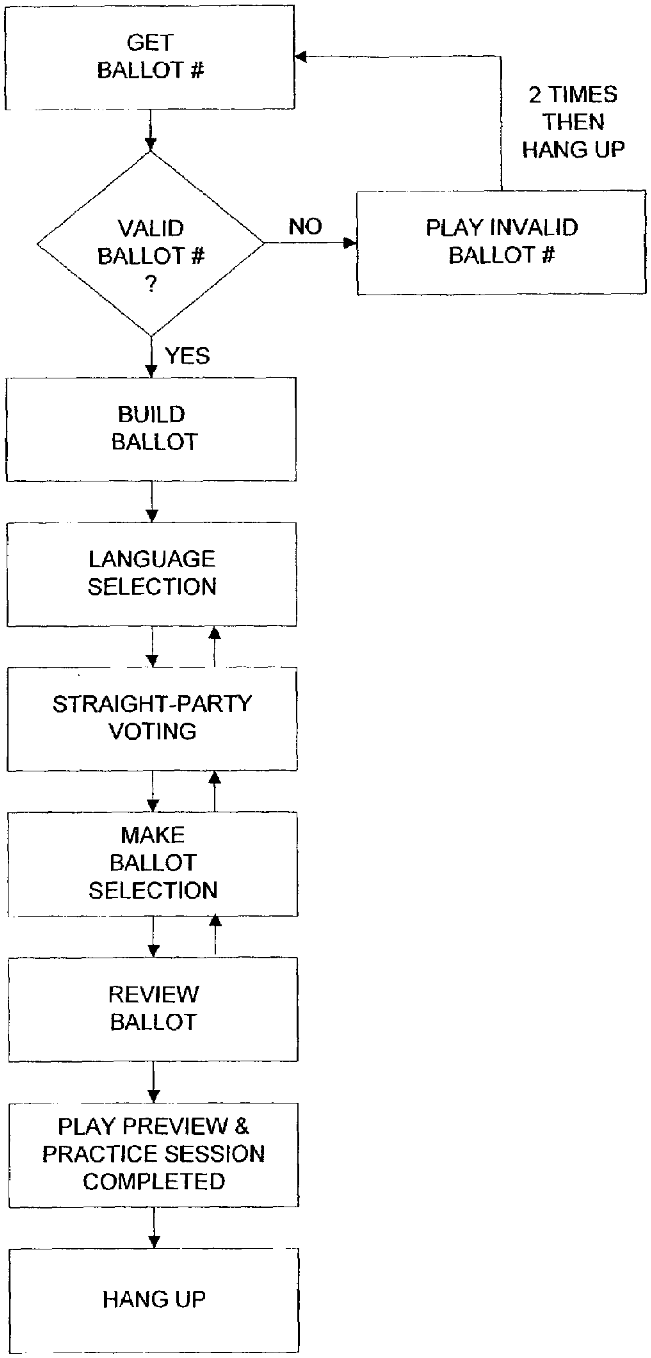
FIG. 5A is a flow chart illustrating the major steps in using the preview and practice server according to the preferred embodiment.

Because the system 100 is a closed system and not reliant on external data connections, a preview and practice server 14 is preferably provided to maximize the benefits to persons with disabilities. The preview and practice server 14 allows users to dial into the server 14 via a public switched telephone network 16 and access the ballots to be used. FIG. 5A shows the process involved in using the preview and practice server 14. The user will be prompted to input a ballot number (that will be provided to designated users by the election officials). If the user inputs a valid ballot number, the ballot is built in the same manner as described above. Thereafter, the user can navigate the ballot in the identical manner in which the user will navigate the ballot on election day. The preferred preview and practice server 14 is a Pentium-class personal computer with 512 K Cache, 256 MB RAM, 60 GB hard drive, with a Dialogic D240SC-T1 telephony voice card that runs the software 53.

Figure 7:
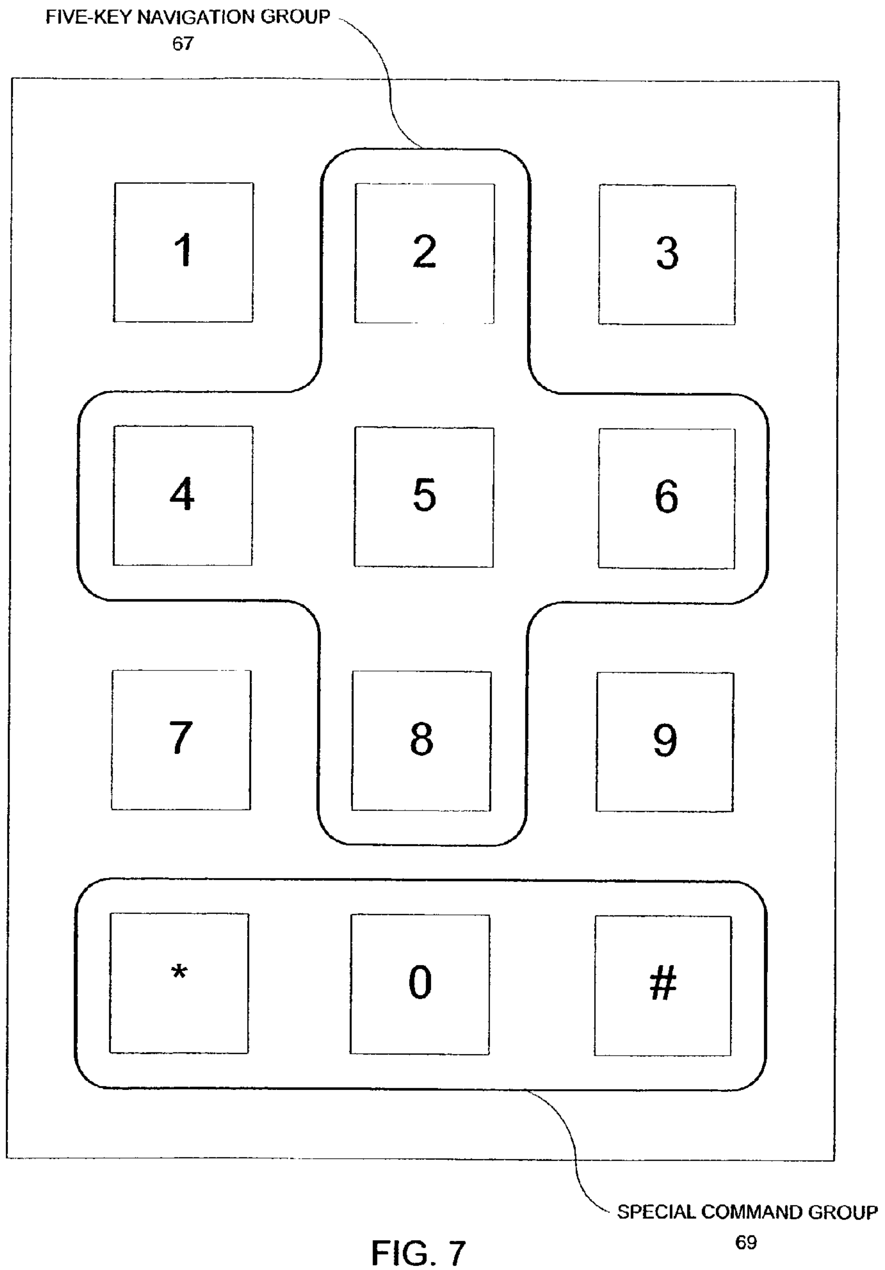
FIG. 7 is a graphical representation of the interface keypad of the preferred embodiment of the input device, illustrating the position of two special-purpose groups of keys on a standard telephone.

FIG. 7 illustrates the preferred embodiment of the input device 64 and the keypad 59. Telephones are ubiquitous appliances and therefore very familiar. In particular, persons with visual impairments find telephones to be essential to their daily lives, and so they are intimately familiar with the structure and layout of a standard 12-button telephone keypad. As a result, this 12-button keypad is preferred as the input device 64 (or alternatively keypad 59). In the preferred embodiment, the system 100 divides the 12-key touchpad into two sets of special key groups: a five-key navigation group 67 and a three-key special command group 69. The preferred embodiment utilizes these special groups to provide a novel 5-key navigation system to assist the voter in navigating through the menu structures of the ballot. This 5-key navigation system is designed to give the visually impaired voter a mental image of a physical ballot that is laid out with various contests located from top to bottom and with various candidates within those contests laid out from left to right. To facilitate its use by visually impaired persons, the system incorporates a novel and intuitive 5-key navigation system whereby the '4' and '6' keys are used to navigate within a single level (for example, within the contest for President, the '4' and '6' keys are used to scroll through all the candidates for President). The '4' key is used to go to the previous candidate; the '6' key is used to go to the next candidate; and the '5' key is used to select and deselect a candidate.

In a similarly intuitive manner, the '2' and '8' keys are used to navigate through different levels (for example, to navigate from the contest for President to the contest for Senator to the contest for Representative, and vice versa). The '2' key is used to go to the previous contest and the '8' key is used to go to the next contest.

Figure 8:
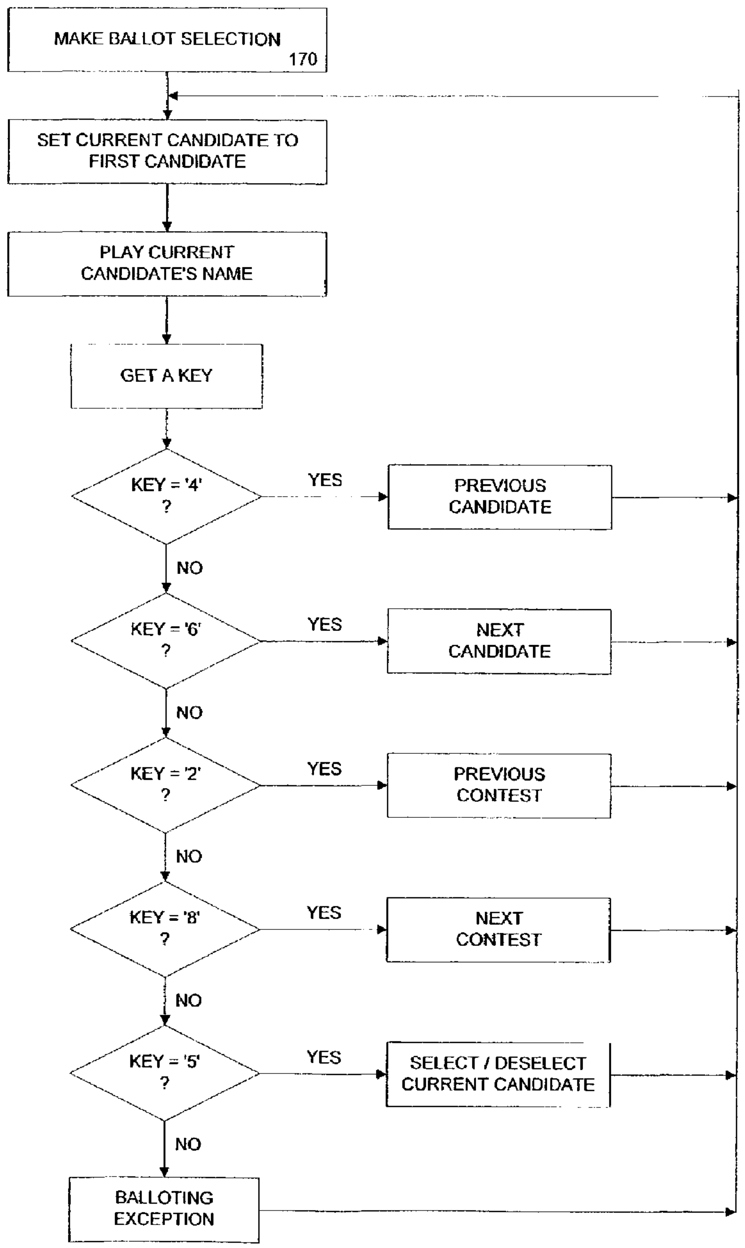
FIG. 8 is a flowchart describing the logic of the preferred embodiment of the input device user interface as used to make selections.

FIG. 8 illustrates the manner in which a voter can use the 5-key navigation system. The first contest is automatically provided and the script from the audio file 12*b* according to that candidate is played for the voter through the receiver 62 (or headphones connected to a personal digital audio player). For instance, the audio file 12*b* might state: "JOHN DOE, REPUBLICAN PARTY. IF YOU WOULD LIKE TO SELECT THIS CANDIDATE, PRESS '5'. IF YOU WOULD LIKE TO HEAR THE PREVIOUS OR NEXT CANDIDATE, PRESS '4' OR '6'. IF YOU WOULD LIKE TO GO TO THE PREVIOUS OR NEXT CONTEST, PRESS '2' OR '8'". If the voter is already at the first candidate and inputs a "4" to go to the previous candidate, the system reads another audio file 12*b*, for instance: "THIS CANDIDATE IS THE FIRST CANDIDATE. THERE ARE NO PREVIOUS CANDIDATES." In like manner, the voter is able to navigate among candidates by using the '4' and '6' keys.

Figure 8A:
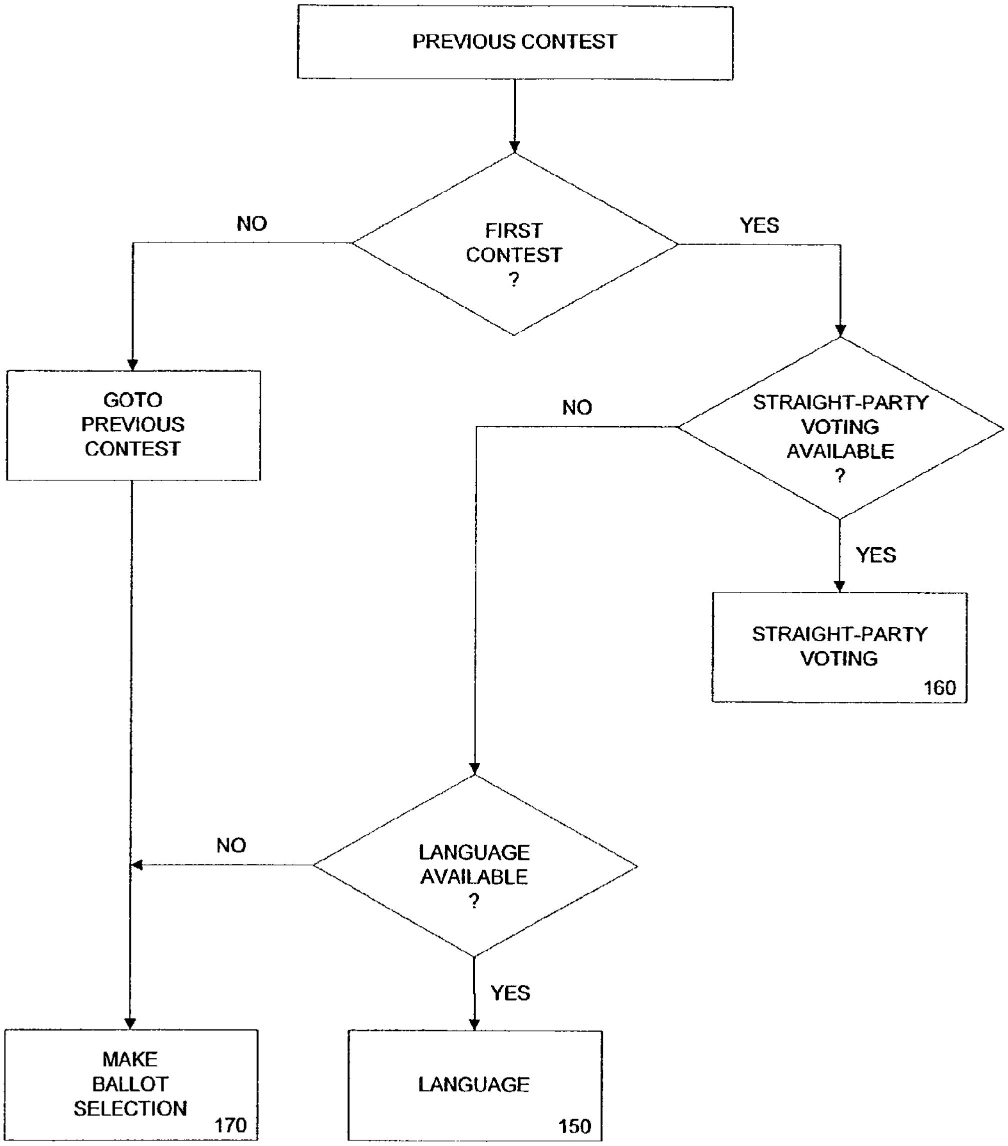
FIG. 8A is a flow chart illustrating the logic employed in moving to the previous contest.

Referring now to FIGS. 5 and 8A, if the user attempts to go to a previous contest (by pressing the '2' key) and is already at the first contest, the 5-key navigation system moves vertically to the previous category, which is straight party voting (step 160). In other words, the '2' and '8' keys move vertically not only among contests, but also among the macroscopic steps in the entire voting process, as depicted in FIG. 5.

Figure 8B:
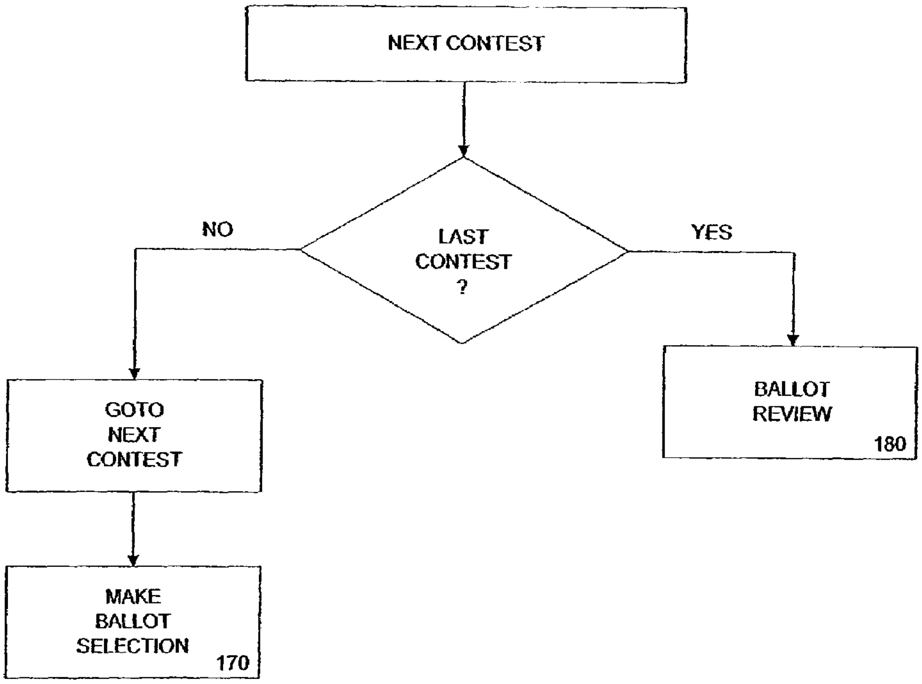
FIG. 8B is a flow chart illustrating the logic employed in moving to the next contest.

Referring now to FIGS. 5 and 8B, the user can use the '8' key to go to the next contest and navigate through the choices using the '4' and '6' keys, and make selections using the '5' key. If the user attempts to go to the next contest and is already at the last contest, the '8' key will move the voter to ballot review (step 180).

Figure 8C:
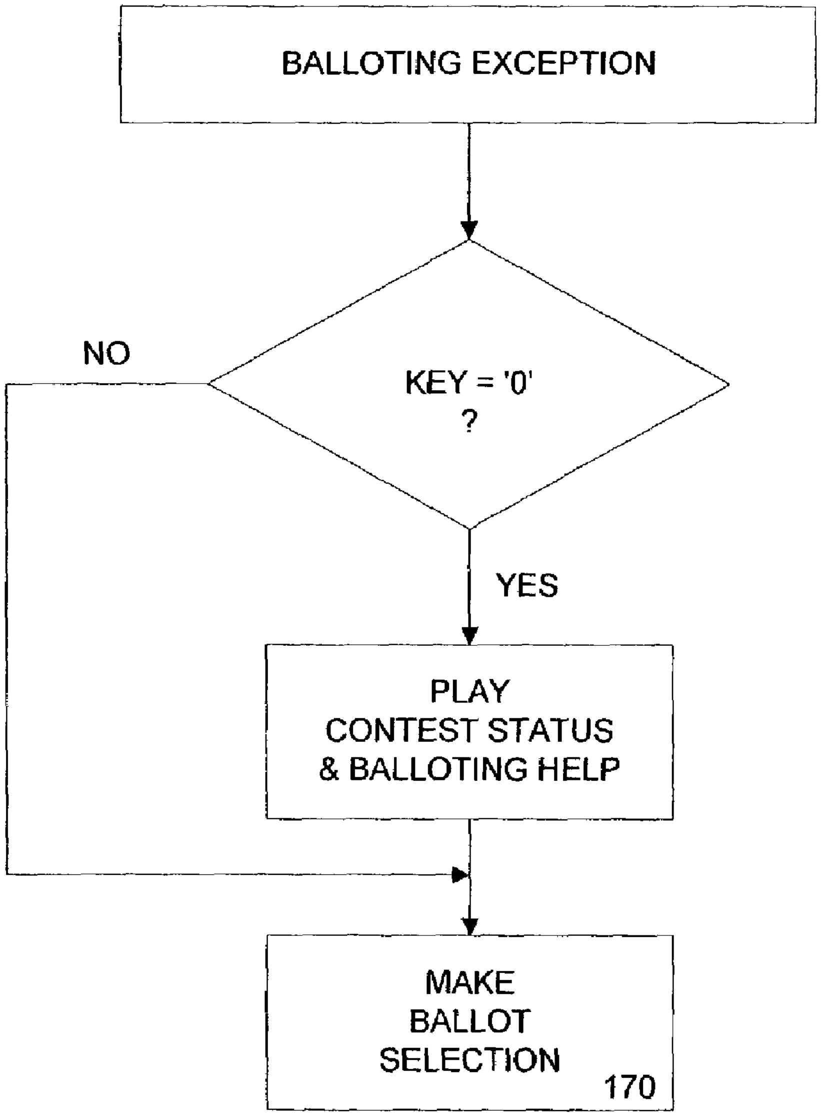
FIG. 8C is a flow chart illustrating the logic employed in dealing with a ballot exception.

FIG. 8C illustrates what happens if the user inputs a key that is invalid, thus creating a ballot exception. If the key is '0', the system will activate the context-sensitive help that provides the user with a status update as to what has occurred. The status update informs the user where they are, what selections they have made, what selections are possible to be made, and where they can go from here. For example, the audio file 12*b* might state: "YOU ARE MAKING YOUR SELECTIONS FOR CITY COUNCIL. CURRENTLY, YOU HAVE ONLY SELECTED ONE OF THREE POSSIBLE CANDIDATES: JANE DOE, DEMOCRAT. YOU WILL HEAR THE CANDIDATES' NAMES ONE AT A TIME. WHEN YOU HEAR A NAME, PRESS '5' TO SELECT OR DESELECT THAT CANDIDATE. USE '4' AND '6' TO GO TO THE PREVIOUS OR NEXT CANDIDATE. TO GO TO THE NEXT CONTEST, PRESS '8'. TO GO BACK TO THE PREVIOUS CONTEST, PRESS '2'. YOU ARE NOW BACK TO THE CANDIDATE LIST."

Figure 9:
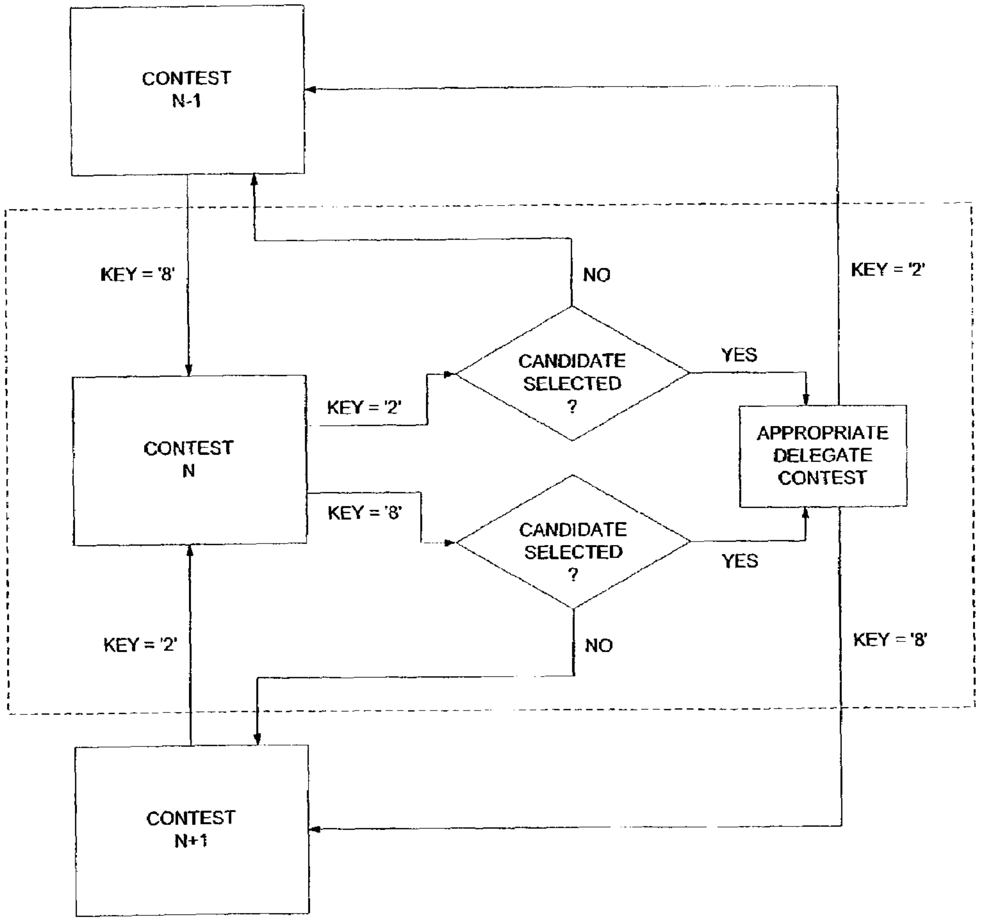
FIG. 9 is a flow chart describing the logic employed for a dependent delegate contest.

FIG. 9 illustrates an exemplary process for using the 5-key navigation system in a contest (Contest N) that has subcontests, for instance a dependent delegate contest. Such example might occur in a presidential contest where the slate of delegates may depend upon which presidential candidate is chosen. If the user is currently in a contest that has subcontests (that is, Contest N), pressing '2' or '8' will then take the user to the subcontest for that candidate. Only then will the user be able to move to the previous contest (Contest N−1) or the next contest (Context N+1).

Figure 10:
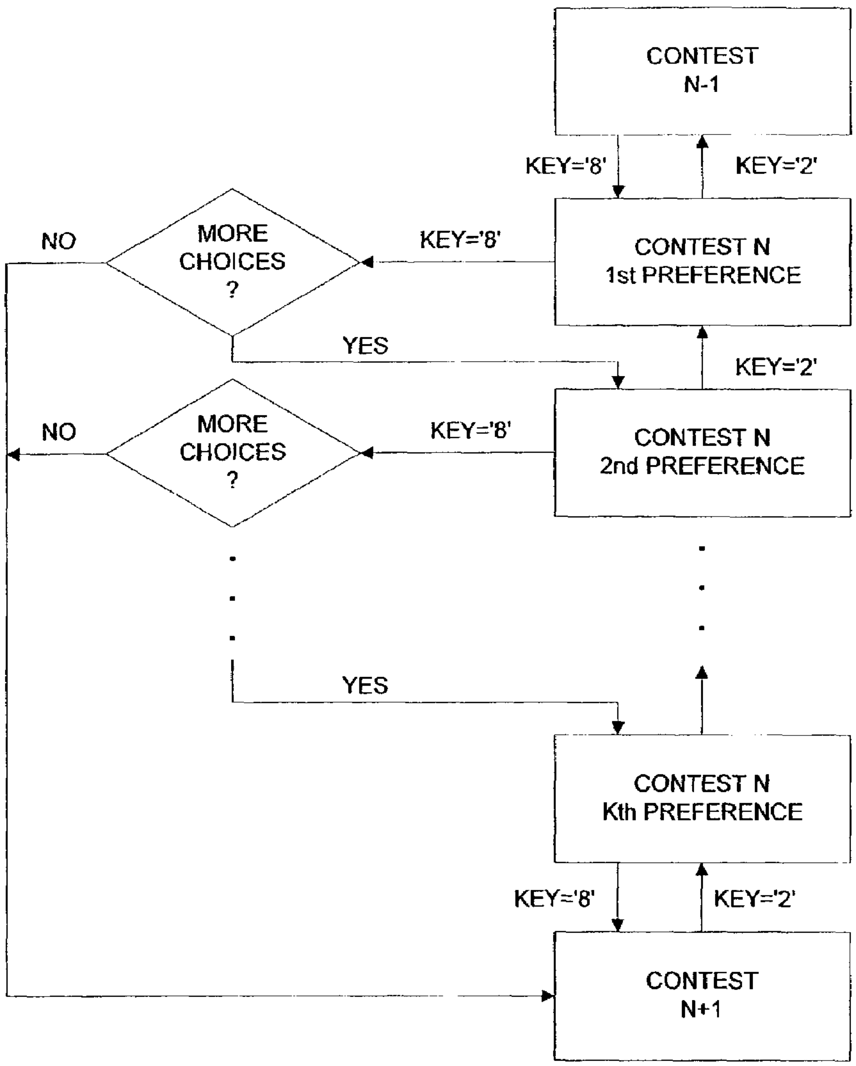
FIG. 10 is a flow chart describing the logic employed for a ranked order contest.

FIG. 10 illustrates an exemplary process for dealing with rank-order voting whereby a voter can vote for more than one candidate and assign a rank to each. When the voter is in a contest having rank-order capability (Contest N), the first preference is chosen and the voter moves to the next preference by pressing '8'. This continues for as many candidates as the precinct allows to be ranked, after which pressing '8' moves the voter to the next contest (Contest N+1).

Figure 11:
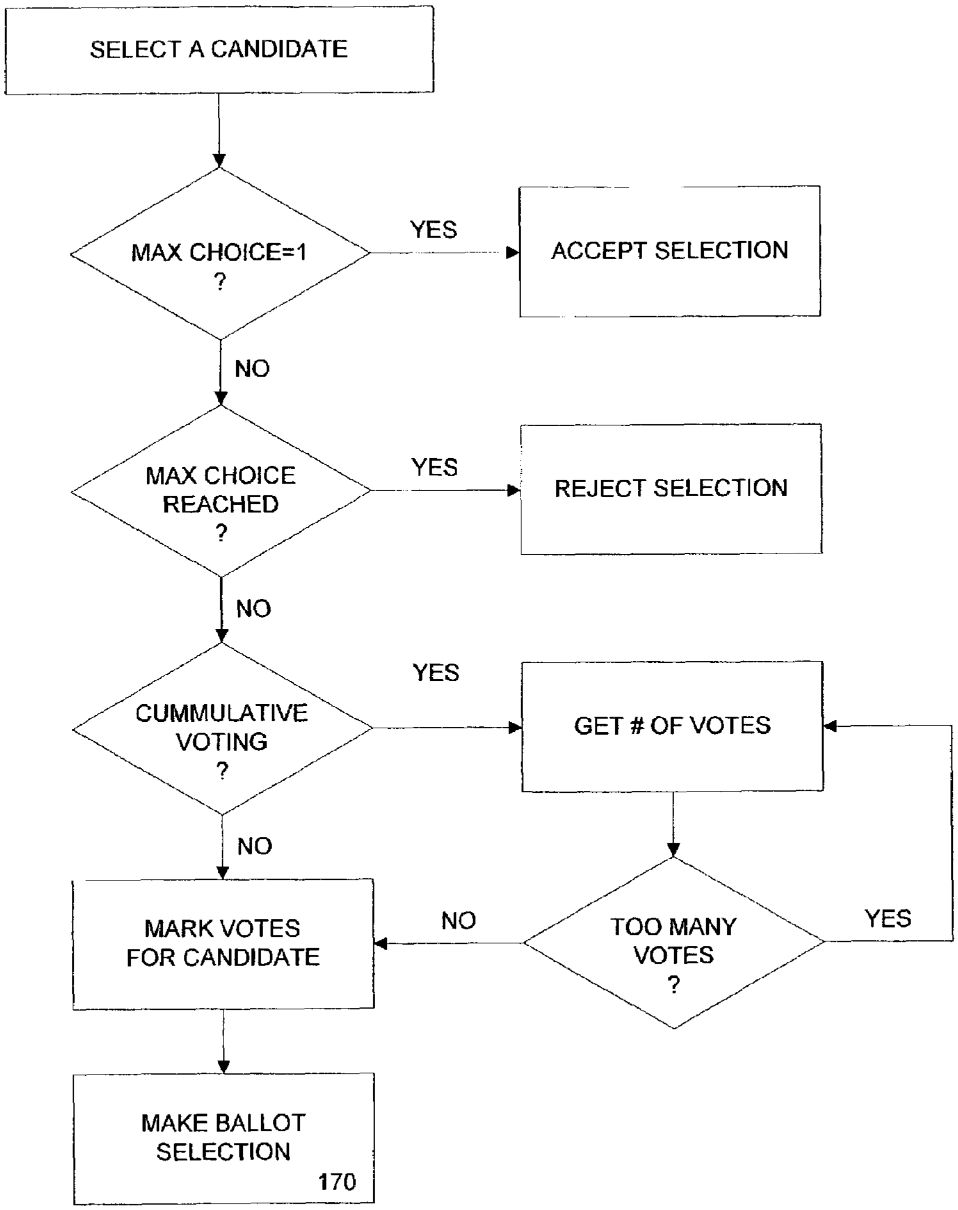
FIG. 11 is a flow chart describing the logic employed for a cumulative voting contest.

FIG. 11 illustrates an exemplary process for dealing with cumulative voting whereby a voter can cast multiple votes for multiple candidates. Upon selecting a candidate, the system 100 determines if the candidate is able to receive more than one vote. If so, the system 100 looks to see if the user has already used all the votes possible to allocate in this race. If so, the user's attempt is rejected. If not, the system 100 accepts the number of votes chosen so long as the total number does not exceed the maximum.

Figure 12:
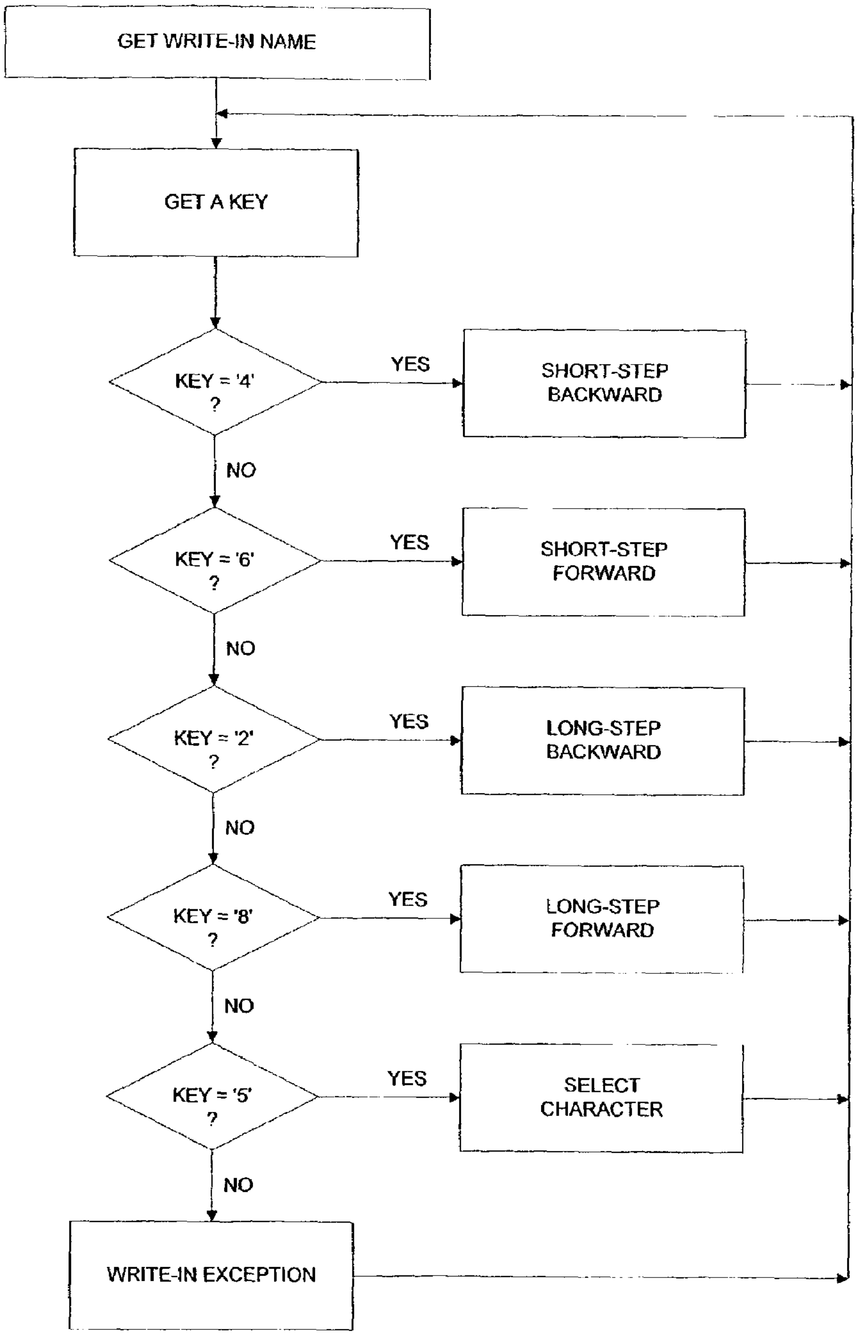
FIG. 12 is a flow chart describing the logic of a five-key symbol navigation system for spelling a write-in candidate according to the preferred embodiment.

Occasionally voters desire to vote for a candidate that is not listed on the ballot. Such a candidate is deemed a write-in candidate, and the voter must enter that candidate's name. For voters having no visual or cognitive disability, writing in a candidate is a simple process. However, for voters with such disabilities, the process can be complicated unless the system 100 comprises a similarly straightforward and intuitive navigation system. FIG. 12 illustrates such an exemplary navigation system for dealing with write-in candidates. The system 100 prompts the user through the alphabet and available symbols, one character at a time, beginning with "A" and continuing until the user selects a character (by depressing the '5' key), at which point the system 100 restarts prompting for another character, again beginning with "A". In a similar manner as before described in relation to the 5-key navigation system for standard ballot navigation, the voter uses the '4' key to hear the previous character, and the '6' key to hear the next character, and selects a character using the '5' key. In addition, the 5-key navigation system of the preferred embodiment incorporates a long step using the '2' and '8' keys, whereby these keys will jump a given number of characters backwards or forwards, respectively. For example, the long step can be programmed to be a five-character step (e.g., A to F to K to P, etc.), a ten character skip (A to K to U, etc.), and so forth.

Figure 12A:
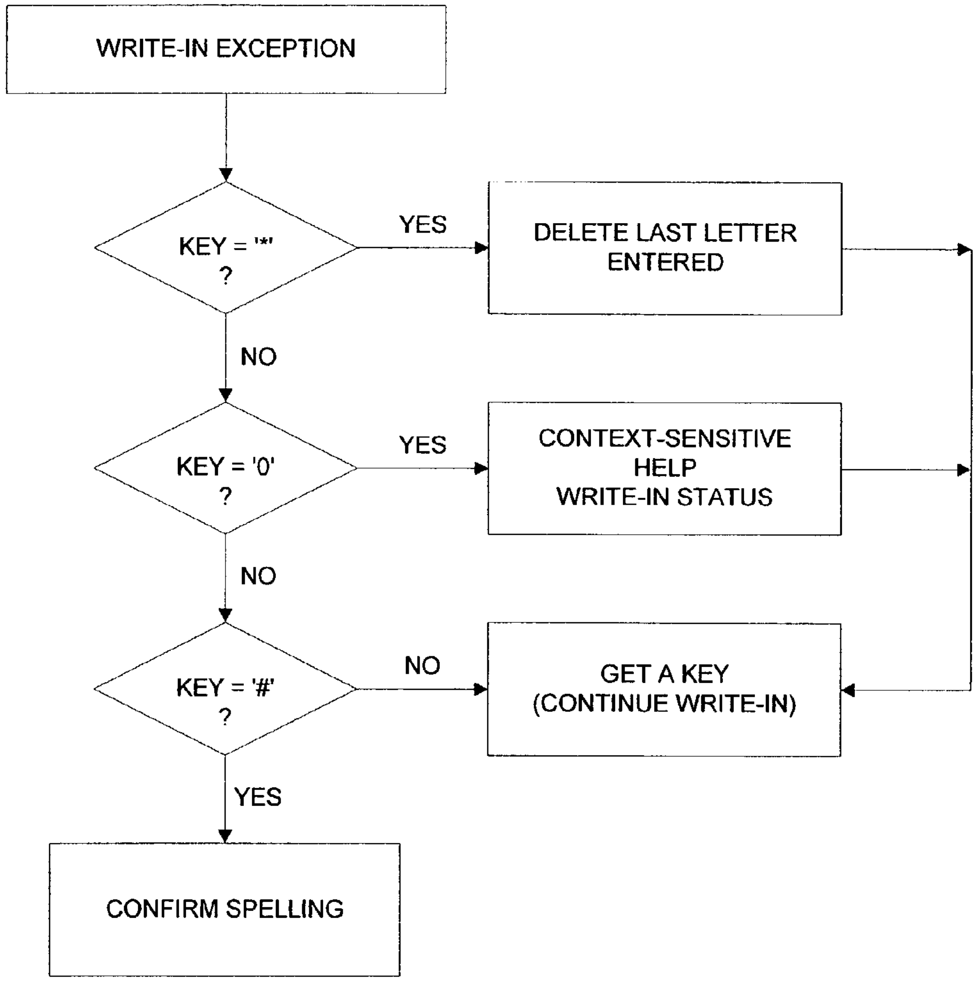
FIG. 12A is a flow chart describing the logic employed in a five-key navigation system unrecognized inputs for write-in candidates according to the preferred embodiment.

Occasionally a voter will make a mistake while using the input device 64, for example by inputting an incorrect or undesired character. FIG. 12A illustrates an exemplary process for handling such an exception. Referring again to FIG. 7, the special command group 69 preferably will comprise an asterisk key ('*'), the zero key ('0'); and the pound key ('#'). These keys have special uses within the navigation system. The asterisk key ("*") is used as a character delete key that deletes the last character entered. The '0' key is preferably a context-sensitive help key that provides the user with a status update of what has been spelled up to that point. The pound key ("#") will be recognized as the end of the write-in process and send the user to the confirm spelling process. At all times, not just during a write-in process, the '0' key is preferably a context-sensitive help key that provides the user with a complete status update, describing where the user currently is in the system 100, what has been entered, and what options are available.

Figure 12B:
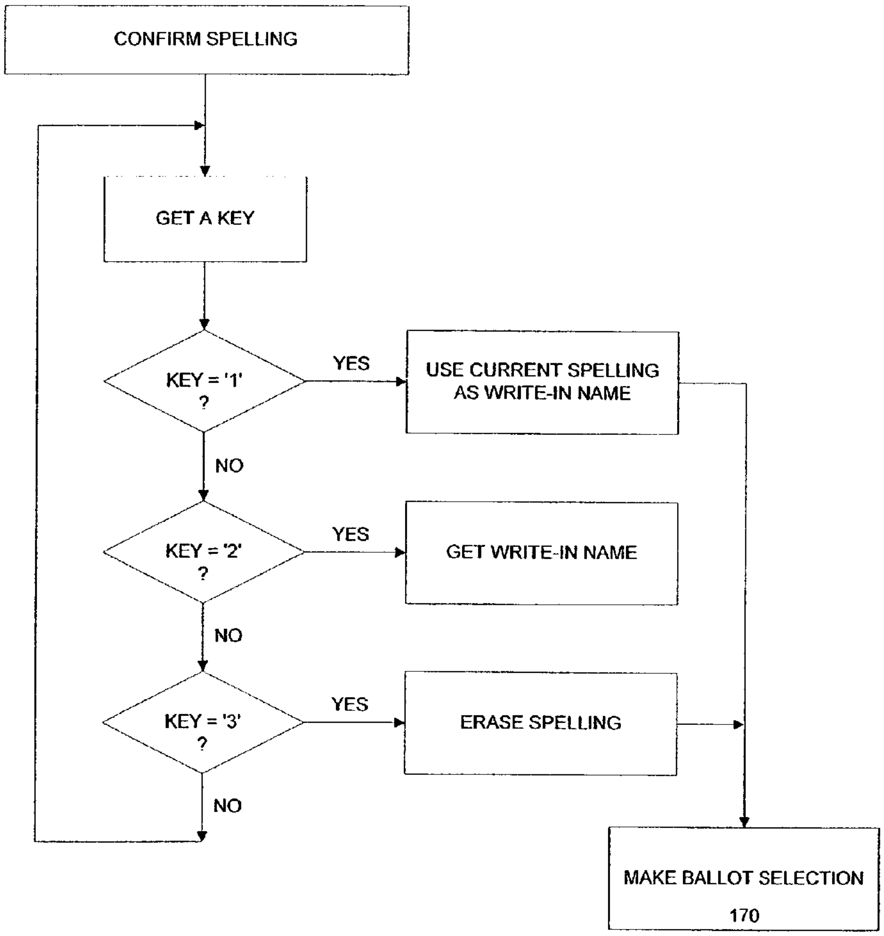
FIG. 12B is a flow chart illustrating the logic used in the process to confirm the spelling of a write-in candidate, according to the preferred embodiment.

Once the voter has finished inputting the name of the write-in candidate, the system 100 prompts the voter to confirm the spelling. FIG. 12B illustrates an exemplary process for confirming the spelling. Once the pound key is entered, the system informs the user what has been entered, and then asks if this is correct. If so, the user presses '1'. If it is wrong, the user presses '2'. If the user changes his mind and does not want to do a write-in name, the user presses '3' which erases the write-in spelling and returns to the regular candidate list to vote for listed candidates (step 170).

Figure 13:
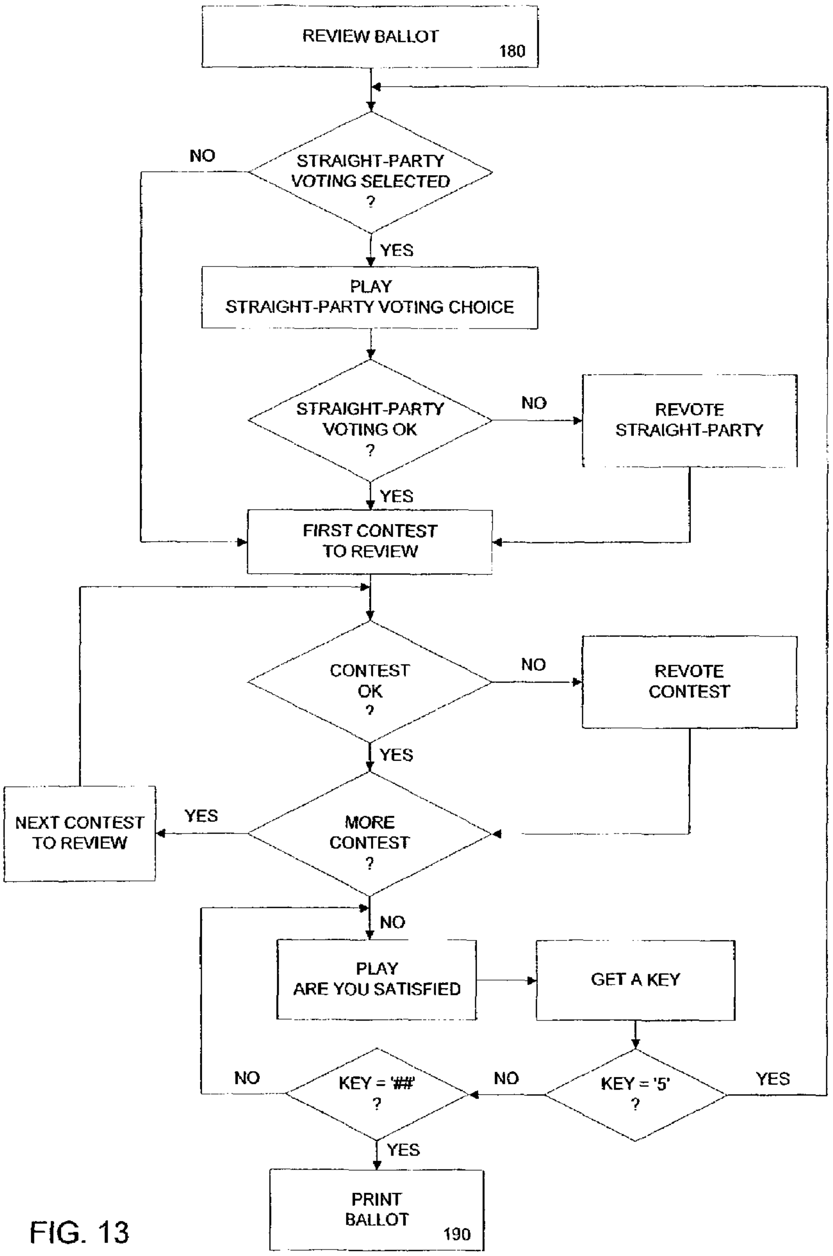
FIG. 13 is a flow chart illustrating the review ballot process according to the preferred embodiment.

After all ballot selections have been made (FIG. 5, step 170 and FIGS. 7–12B), the system 100 employs a ballot review process (step 180). FIG. 13 illustrates an exemplary logic for such process. During this process, the user is walked through each choice made, beginning with the straight-party voting selection (step 160), if made. At each contest, the user hears the current selections and is prompted to press '5' to re-vote, '2' to go to the previous contest, or '8' to go to the next contest. After all review has been done and the user is satisfied with the selections, the user is prompted to hit the pound key twice. This signals the user module 40 to print the official ballot (step 190).

In addition, either prior to or as part of the ballot review process, if an undervote situation exists (for example, the user can vote for three of six candidates, but has only voted for only one or two), the system 100 prompts the user of the undervote situation and ensures that the voter either select the appropriate number of candidates or confirm that an undervote situation is desired.

Figure 14:
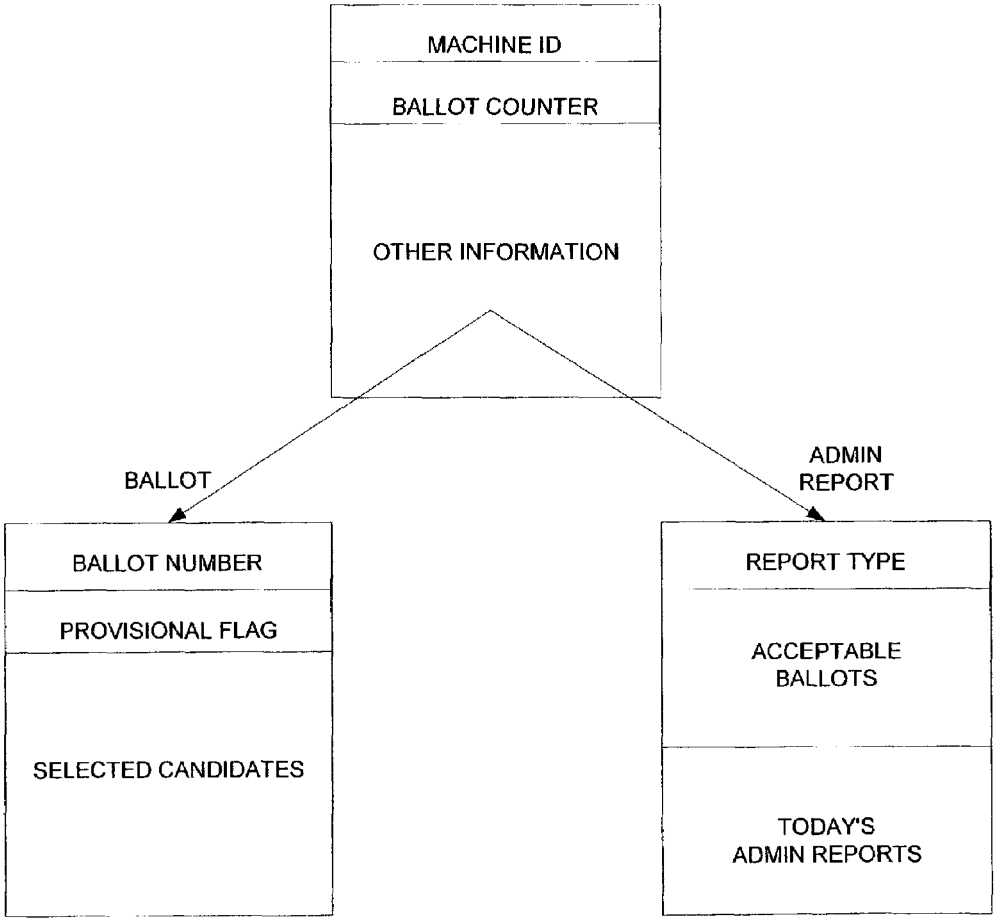
FIG. 14 is a chart showing the structure of the identification symbol (2-D barcode or any other machine-readable identification symbol) printed on a ballot or an administrative report according to the preferred embodiment.

FIG. 14 illustrates the type of information utilized in the identification symbol that is printed on both the official ballot and the administration report. Referring again to FIG. 3, all bar codes begin with the machine identification 54*a* and the ballot counter 54*b*. The official ballot is encoded with the further information of a provisional ballot indicator (if applicable) and the selected candidates of the user. The administration report is further encoded with a report type (configuration, open poll, or close poll); acceptable ballots;

and the administrative report log 54*d* that indicates everything that happened to the user module 40 during the day.

In this manner, the system 100 according to the preferred embodiment employs several unique anti-fraud features including methods of detecting double counts (described above), ballots that are out of range, provisional ballots, missing ballots, and verifying open and close poll reports. Back at the central election office where the official votes are tabulated is the vote tabulator 24 (see FIG. 1). It should be noted that a vote tabulator 24 can be employed at the precinct level, but is not preferred due to cost reasons and the small number of visually-impaired voters typically in each precinct. The vote tabulator 24 typically comprises a standard pc-based computer running the software used in the system 100 and an identification symbol reader for reading the identification symbol on the ballots. The reader can be hand-held or larger. The preferred vote tabulator 24 is a Pentium-class personal computer with 512 K Cache, 256 MB RAM, and at least 20 GB hard drive, that runs the software 53. The preferred reader is a two-dimensional bar code scanner, e.g., HHP IT4410 Hand held 2D image reader.

Taken together, the material collected from the precincts at the end of the day consists of: a set of administrative reports (open poll and close poll reports), a set of cast ballots 22, a set of provisional ballots, and a set of spoiled ballots 22. At the central election office, the provisional ballots are divided into two subsets: one for the ballots cast by voters whose registration status can be verified as valid, the other invalid.

First, the administration reports are scanned in. The software 53 can immediately detect multiple open poll and close poll procedures from the same voting machine since each administration report contains all administration activities logged on the processing unit 50 for the entire day. The software 53 can also determine a range of ballot counters 54*b* for each processing unit 50 from the time the polls open until the polls closed.

Figure 15:
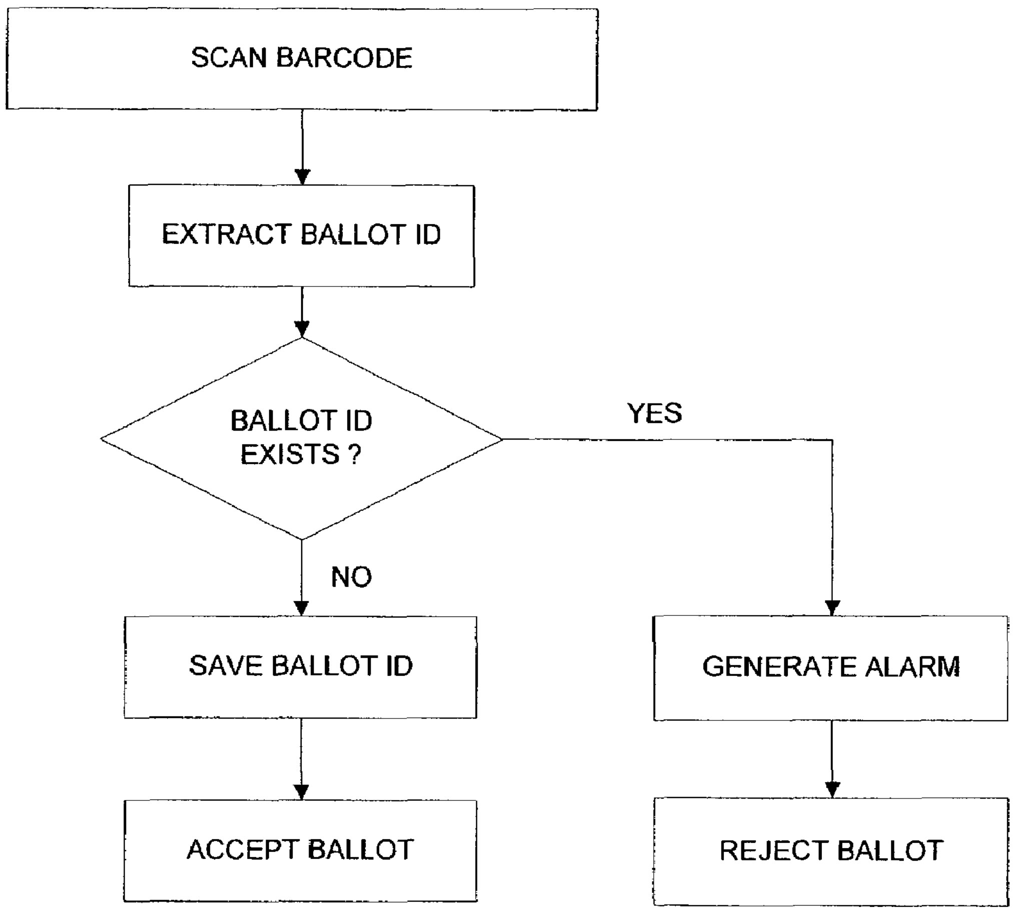
FIG. 15 is a flow chart showing the logic employed in preventing double-counts according to the preferred embodiment.

Second, the ballots 22 are then scanned in. FIG. 15 illustrates a process the vote tabulator 24 uses to deal with the possibility of double-counting a ballot. Each time a ballot 22 is scanned it first extracts the ballot identification (machine identification 54*a* plus ballot counter 54*b*) of the identification symbol 23. If the reader has seen that ballot identification previously, an alarm is generated to reject the ballot. If the reader has not seen that ballot identification previously, it saves the ballot identification and accepts the ballot 22.

Typically, the cast ballots 22 are scanned in first, then verified provisional ballots, then non-verified provisional ballots, and finally spoiled ballots. Together, these ballots should account for all ballots in each range of ballot counters 54*b* described above. Any missing ballots in these ranges can be easily detected. Also, every ballot outside of the range for a processing unit 50 will be reported as a problem since that ballot must have been printed before the polls opened or after the polls closed.

Obviously, the cast ballots 22 are counted as long as their identification symbols 23 indicate they are not provisional. The provisional ballots, whether verified or non-verified, must have identification symbols 23 that indicate they are provisional. The verified provisional ballots are counted like other cast ballots 22. The non-verified provisional ballots are treated like spoiled ballots-they are not included in the final tally.

While there has been described and illustrated particular embodiments of a novel system and method for providing a unique audio interface and navigation protocol to users of automated systems, and in particular, a system and method for voting using a telephonic audio interface to allow voters to hear options and indicate their selections using standard keys on a telephone that generates an official paper ballot, and that can allow users both to preview and practice voting as well as to actually vote in an election, it will be apparent to those skilled in the art that variations and modifications may be possible without deviating from the broad spirit and principle of the present invention, which shall be limited solely by the scope of the claims appended hereto.

What is claimed is:

1. In a system for voting comprising a user module having an operating system for running election software enabling a user to make selections thereon, an election management system for generating election data files and audio files to be used by said user module, and a vote tabulator; a uniquely identifiable non-transient record comprising:

an official paper ballot having a machine-readable identification symbol imprinted thereon and having said selections of said user imprinted thereon in human-readable form; and wherein said machine-readable identification symbol further comprises a machine identification and a ballot counter.

2. The uniquely identifiable non-transient record of claim 1 wherein said machine identification is a serial number.

3. The uniquely identifiable non-transient record of claim 1 wherein said machine identification is an alphanumeric string uniquely identifying said user module.

4. A system for voting comprising:

a user module further comprising a processing unit and an operating system running election software, a PC sound card, a media drive, non-volatile memory, a user interface and a printer;

an election management system for generating election data files and audio files to be used by said user module;

a vote tabulator further comprising a reader for reading identification symbols; wherein a voter listens to said audio files and makes selections via said user interface, causing said user module to activate said printer to print an official ballot wherein said official ballot contains said voter's selections in human-readable form and encodes said selections in a unique identification symbol readable by said reader; and wherein said software includes a two-dimensional barcode generation software.

5. A system for voting comprising:

a user module further comprising a processing unit and an operating system running election software, a PC sound card, a media drive, non-volatile memory, a user interface and a printer;

an election management system for generating election data files and audio files to be used by said user module;

a vote tabulator further comprising a reader for reading identification symbols; wherein a voter listens to said audio files and makes selections via said user interface, causing said user module to activate said printer to print an official ballot wherein said official ballot contains said voter's selections in human-readable form and encodes said selections in a unique identification symbol readable by said reader; and wherein said reader is a two-dimensional barcode scanner.

6. A system for voting comprising:

a user module further comprising a processing unit and an operating system running election software, a PC sound card, a media drive, non-volatile memory, a user interface and a printer;

an election management system for generating election data files and audio files to be used by said user module;

a vote tabulator further comprising a reader for reading identification symbols; wherein a voter listens to said audio files and makes selections via said user interface, causing said user module to activate said printer to print an official ballot wherein said official ballot contains said voter's selections in human-readable form and encodes said selections in a unique machine-readable identification symbol readable by said reader having encoded therein said selections of said user; and wherein said machine-readable identification symbol further comprises a machine identification and a ballot counter.

7. The system according to claim 6 wherein said machine identification is a serial number.

8. The system according to claim 6 wherein said machine identification is an alphanumeric string uniquely identifying said user module.

9. A preview and practice server for voting system, coupled to a publicly switched telephone network, comprising:

a processing unit;

an operating system coupled to said processing unit and running election software using data from an election management system containing valid ballots for all appropriate users; and a telephony voice card coupled to said processing unit and said election software for interacting with users of said publicly switched telephone network; wherein said users dial into said preview and practice server via a standard telephone to preview said valid ballots and practice navigating said valid ballots by making inputs using said standard telephone.

10. The preview and practice server for a voting system of claim 9 wherein upon receiving a call from users, said preview and practice server prompts said users to input a code pertaining to a valid ballot.

11. The preview and practice server for a voting system of claim 10 wherein upon receiving a code for a valid ballot from said users, said preview and practice server builds an appropriate ballot for a particular user utilizing said actual election data from said election management system.

12. The preview and practice server for a voting system of claim 11 wherein upon building an appropriate ballot for said particular user, said preview and practice server enables said particular user to navigate through said appropriate ballot via inputs into said telephone, whereby said user can preview and practice making selections on said appropriate ballot that is identical to a ballot that will be used in an actual election.

13. In a voting system for receiving a vote from a voter utilizing user modules that generate an administrative report log containing an administrative report identification symbol thereon every time said user modules are opened or closed, a method for preventing fraudulent votes and for creating an official physically auditable paper trail comprising the steps of:

audibly prompting said voter via user module to make voting selections;

receiving a command from said voter via said user module;

generating an official paper ballot;

encoding a machine ID, a ballot counter, and said voting selections into a uniquely identifiable machine-readable identification symbol depicting said voting selections on said official paper ballot in human-readable form and depicting said uniquely identifiable machine-readable identification symbol on said official paper ballot;

scanning said administrative report logs with an image reader coupled to image translation software for translating into usable formats for elections;

tabulating said voting selections by scanning said uniquely identifiable machine-readable identification symbol on said official paper ballots with said image reader; and utilizing said human-readable form of said voting selections as an official physically auditable paper trail.

* * * * *